US012749363B2

(12) United States Patent
Patterson et al.

(10) Patent No.: US 12,749,363 B2
(45) **Date of Patent: *Sep. 29, 2026**

(54) CONSENSUS BASED AUTHENTICATION AND AUTHORIZATION PROCESS

(71) Applicant: Comcast Cable Communications, LLC, Philadelphia, PA (US)

(72) Inventors: Kathy Patterson, Mt. Laurel, NJ (US); David Beaumont, Mt. Laurel, NJ (US); Sergey Matochkin, Mt. Laurel, NJ (US); Nicholas Beenham, Mt. Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,176

(22) Filed: Feb. 29, 2024

(65) Prior Publication Data

US 2024/0282159 A1 Aug. 22, 2024

Related U.S. Application Data

(63) Continuation of application No. 17/525,504, filed on Nov. 12, 2021, now Pat. No. 11,961,350, which is a (Continued)

(51) Int. Cl.

| | |
|---|---|
| ***G07C 9/22*** | (2020.01) |
| ***G06F 21/00*** | (2013.01) |
| ***G06F 21/31*** | (2013.01) |

(52) U.S. Cl.
CPC ............... *G07C 9/22* (2020.01); *G06F 21/00* (2013.01); *G06F 21/31* (2013.01); *G06F 21/316* (2013.01); *G06F 2221/2133* (2013.01)

(58) Field of Classification Search
CPC ........ G06F 21/00; G06F 21/316; G06F 21/31; G06F 2221/2133; G07C 9/22; G07C 9/00031
See application file for complete search history.

(56) References Cited

U.S. PATENT DOCUMENTS 8,438,617 B2 5/2013 Brainard et al.
8,683,557 B1 * 3/2014 Desikan ................ G06Q 50/01 726/8

(Continued)

OTHER PUBLICATIONS

Brainard et al., "Fourth-Factor Authentication: Somebody You Know," Proceedings of the 13th ACM conference on Computer and communications security, CCS '06, Oct. 30-Nov. 3, 2006, Alexandria, VA, pp. 168-178.

(Continued)

*Primary Examiner* — Yong Hang Jiang
(74) *Attorney, Agent, or Firm* — Banner & Witcoff, Ltd.

(57) ABSTRACT

In accordance with one or more embodiments, authorization and/or authentication protects against unauthorized use of devices and/or features. Devices managing authorization and/or authentication may be connected to communications services, such as the internet or a social network. A user using the communication services may configure a system to authenticate and/or authorize a future action. An authorizer may authorize and/or authenticate by responding via one or more devices and/or social networks to allow an individual to perform an action on a device, as a way of controlling what actions can be taken and who they can be taken by.

40 Claims, 17 Drawing Sheets

Related U.S. Application Data continuation of application No. 15/886,427, filed on Feb. 1, 2018, now Pat. No. 11,176,766, which is a continuation of application No. 14/851,487, filed on Sep. 11, 2015, now Pat. No. 9,922,475.

(56) References Cited

U.S. PATENT DOCUMENTS

| | | | | |
|---|---|---|---|---|
| 8,844,012 | B1 * | 9/2014 | Chan | H04W 12/06 709/225 |
| 9,043,878 | B2 | 5/2015 | Terris et al. | |
| 9,380,058 | B1 * | 6/2016 | Ligatti | H04L 63/08 |
| 9,432,470 | B2 | 8/2016 | Mo et al. | |
| 9,961,076 | B2 | 5/2018 | Stoops et al. | |
| 9,998,441 | B2 | 6/2018 | Cao | |
| 10,360,356 | B2 * | 7/2019 | Moloian | G06F 21/40 |
| 10,452,909 | B2 | 10/2019 | Livesay et al. | |
| 10,659,453 | B2 | 5/2020 | Huang | |
| 10,909,582 | B1 | 2/2021 | Brandt et al. | |
| 2003/0009386 | A1 * | 1/2003 | Menninger | G06Q 10/06 705/7.36 |
| 2003/0149781 | A1 | 8/2003 | Yared et al. | |
| 2003/0208684 | A1 | 11/2003 | Camacho et al. | |
| 2004/0002878 | A1 | 1/2004 | Maria Hinton | |
| 2004/0215557 | A1 | 10/2004 | Michelsen | |
| 2005/0081045 | A1 * | 4/2005 | Nicodemus | H04L 9/3226 713/182 |
| 2010/0242121 | A1 * | 9/2010 | Johnson | G06Q 10/06 726/28 |
| 2012/0123959 | A1 | 5/2012 | Davis et al. | |
| 2012/0197729 | A1 * | 8/2012 | Bertram | G06Q 30/02 705/14.64 |
| 2013/0073975 | A1 * | 3/2013 | Bladel | G06Q 50/265 715/739 |
| 2014/0043141 | A1 | 2/2014 | Cazanas et al. | |
| 2014/0115693 | A1 | 4/2014 | Schieman et al. | |
| 2014/0331278 | A1 * | 11/2014 | Tkachev | H04L 63/08 726/1 |
| 2014/0331282 | A1 * | 11/2014 | Tkachev | H04L 63/0884 726/3 |
| 2016/0006734 | A1 | 1/2016 | Huang | |
| 2016/0021116 | A1 | 1/2016 | Maguire et al. | |
| 2016/0180620 | A1 | 6/2016 | Eyring et al. | |
| 2017/0118025 | A1 * | 4/2017 | Shastri | H04L 9/00 |

OTHER PUBLICATIONS

Vivek Pathak and Liviu Iftode, “Byzantine Fault Tolerant Public Key Authentication in Peer-to-Peer Systems,” published Mar. 2006 in Computer Networks: The International Journal of Computer and Telecommunications Network, vol. 50, Issue 4.

* cited by examiner

1605

| Action (1610) | Member (1615) | Tier (1620) | Criteria (1625) | Wait (1630) | App (1635) | SMS (1635) | Squeeker (1635) |
|---|---|---|---|---|---|---|---|
| Door | John Q | 1 | Any | 5 min | 012856 | 555-5555 | @huffy978 |
| Door | Sarah Q | 1 | Any | 5 min | 012857 | 777-7777 | |
| Door | Ralph | 2 | 66% | 10 min | 000058 | | |
| Door | Nana | 2 | 66% | 10 min | 026789 | 888-8888 | |
| Door | Lawrence | 2 | 66% | 10 min | 023548 | | |
| Door | Susan | 3 | All | 15 min | | | @daSuz981 |
| Door | Larry | 3 | All | 15 min | | | @ktnlvr598 |
| TV | John Q | 1 | Any | 20 min | 012856 | 555-5555 | |
| TV | Sarah Q | 2 | Any | 10 min | 012857 | 777-7777 | |

FIG. 16

1805

| Member (1807) | Group (1810) | Criteria (1815) | Wait (1820) | Fingerprint (1825) | Voice (1825) | Picture (1825) |
|---|---|---|---|---|---|---|
| John Q | 1 | 1 | 5 min | 02987 | 02987 | 02987 |
| Sarah Q | 2 | 1 | 5 min | 02988 | 02987 | 02987 |
| Ralph | 3 | 2 | 10 min | | | 10333 |
| Nana | 4 | 2 | 10 min | | 05664 | 05664 |
| Lawrence | 5 | 2 | 10 min | | | 06311 |
| Susan | 6 | 4 | 15 min | 00130 | 00130 | 00130 |
| Larry | 7 | 4 | 15 min | 00131 | | 00131 |

FIG. 18

CONSENSUS BASED AUTHENTICATION AND AUTHORIZATION PROCESS

CROSS-REFERENCE TO RELATED APPLICATIONS

This application is a continuation of U.S. patent application Ser. No. 17/525,504, filed Nov. 12, 2021, which is a continuation of U.S. patent application Ser. No. 15/886,427, filed on Feb. 1, 2018 (now U.S. Pat. No. 11,176,766), which is a continuation of U.S. patent application Ser. No. 14/851,487, filed on Sep. 11, 2015 (now U.S. Pat. No. 9,922,475), and each of which is hereby incorporated by reference in its entirety.

BACKGROUND

People may encounter situations where they need to allow another person to enter their home or perform some action on their behalf. For example, a homeowner may wish to allow an electrician to access her home while she is away. To do so, the homeowner may have to leave a key under the doormat or have a neighbor let the electrician in. Such approaches may be disadvantageous, as they are not well-controlled and are vulnerable to abuse. For example, the neighbor may be unable to verify whether the electrician should be allowed to enter the house unless they talked to the homeowner themselves. Therefore, a better authentication and authorization process would be desirable.

SUMMARY

Aspects of the disclosure relate to various systems and techniques that provide for more convenient, functional, and easy-to-use ways for individuals to authenticate each other and authorize actions through interfaces provided by computing devices and/or computer software.

According to some aspects described herein, a system may control access to locations and services through leveraging social relationships. A user may intend to grant a requester access to his home or permit the other person to perform an action, for example. When done electronically, it may be difficult to verify the identity of the requester who initiated an authorization request. As described further herein, a system may utilize known social relationships to verify the identity of the requester and make a determination whether a requested action should be allowed. For example, if the user is away from home when an electrician arrives, the system herein may send a snapshot of the electrician to the electrician's company to authenticate his identity. The system may then message the user's friends to authorize the electrician to enter, and the friends may remotely grant the electrician access (e.g., via email or smartphone) and send a command to unlock the user's door. Some aspects described herein may be useful for authenticating a requester's identity, as his social peers may be able to reliably confirm that it was an authorized requester that initiated the request rather than an unauthorized third party. Other aspects described herein may be useful for determining whether an action should be authorized for a known requester by messaging the user's social peers and obtaining consensus approval of a requested action. The system may message more than one person associated with the user and may evaluate received responses against one or more approval criteria.

Some devices may allow access to certain features that a user may wish to protect through authorization and/or authentication. Such devices may also be connected to communications services, such as the internet or a social network. Because communication services may exist that allow for a device to interact with other devices, a user may configure a system to perform an authorization and/or authentication process prior to an action using the communication services. For example, a user may want to authorize and/or authenticate an individual who wishes to watch media content, as a way of controlling what content could be viewed and by whom it might be viewed. For example, a babysitter may request approval to watch a particular movie, and if the user is unavailable to respond to the request, the request may be forwarded to a predefined group of the user's friends or family, asking them to approve of the requested action.

Aspects of the disclosure may provide efficient, effective, and convenient ways of leveraging communication services to facilitate authentication, so as to enable an authentication group to quickly and easily provide feedback. Features described herein may allow authentication group members identified by the user to verify the identity of a person. For example, the user may be a power company, who may designate three employees to verify identities. If an electrician (the requester) desires to enter a home, he may need the three employees to identify his identity before he can be authorized to enter the home.

In accordance with one or more aspects of the disclosure, a computing device may evaluate responses from an authentication group to determine if the identity of a user can be verified. In some embodiments, the computing device may determine an authentication group comprising a plurality of members based on an association with a user. The computing device may determine an approval threshold, and contextual information for authorizing the action. In some embodiments, the computing device may receive an action request initiated by a requester.

Aspects of the disclosure may also provide efficient, effective, and convenient ways of leveraging communication services to facilitate authorization, so as to enable an authorization group to quickly and easily provide feedback. Features described herein may allow users to let their social network of contacts and friends authorize certain actions on the user's behalf, when the user may be unable to do so. In some aspects, a user may be allowed to identify different actions that would ordinarily require authorization by the user, and for each action, the user may identify one or more social network contacts or friends who may be given the authority to authorize the action if the user may be unable to do so. In some aspects, the user may assign different weights to different friends or contacts, for different corresponding actions, and may indicate a required approval threshold. In some aspects, the user's contacts may be assigned to different approval tiers for different actions, such that different weighting amounts may be needed from different tiers of contacts. For example, the user may determine that any of their immediate family members may be authorized to let the electrician (the requester) in the house, but if the family members are unavailable, then the next tier of contacts (e.g., neighbors) would need at least two approvals before letting the electrician in. An ever lower tier of contacts might require at least three approvals, and votes from different tiers may be totaled (e.g., a 50% approval for a 'yes' vote from the 2nd tier of contacts, and a 33% approval for a 'yes' vote from the 3rd tier of contacts).

In accordance with one or more aspects of the disclosure, a computing device may message one or more members of an authorization group in response to a request by a requester. In some embodiments, the computing device may determine an authorization group including one or more members based on an association between the members and the user. The authorization group may be made up of multiple members, which may be organized into multiple tiers. Responses from different members and/or tiers may be weighed differently for a given action. The computing device may send a set of messages to the members of the authorization group. In some instances, the computing device may send a first message to a first authorizing member in a first tier of the authorization group and send a second message to a second authorizing member in a second tier of the authorization group. In some instances, the set of messages may include a request to verify an identity of the requester. The set of messages may include contextual information, such as the time of day or location of the requester. The set of message may also include additional identifying content provided by the requester, such as an image or a video provided by the requester (e.g., an image of the electrician's identification, or photograph taken at the front door by a security system).

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which:

FIG. 16 depicts an illustrative example of an authorization group database.

FIG. 18 depicts an illustrative example of an authentication group database.

DETAILED DESCRIPTION

Figure 1:
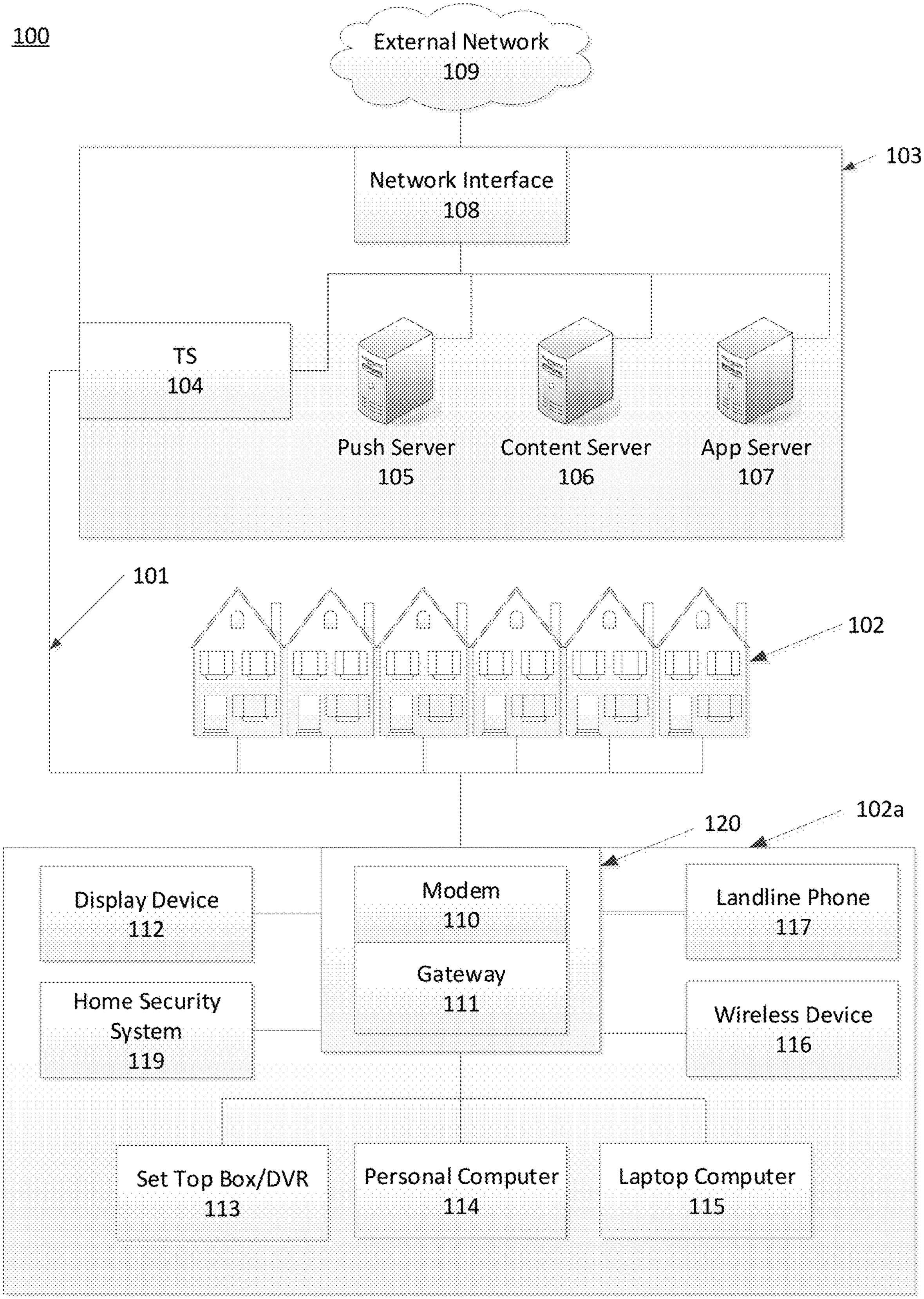
FIG. 1 depicts an illustrative network environment in which one or more aspects of the disclosure may be implemented.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102*a*). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term premises is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The premises 102, such as the example home 102*a*, may include an interface 120, which may include a modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. In certain implementations, the modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102*a* to communicate with the local office 103, the one or more external networks 109, or other devices communicatively coupled thereto. The gateway 111 may include local network interfaces to provide communication signals to client devices in or near the example home 102*a*, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device.

Figure 2:
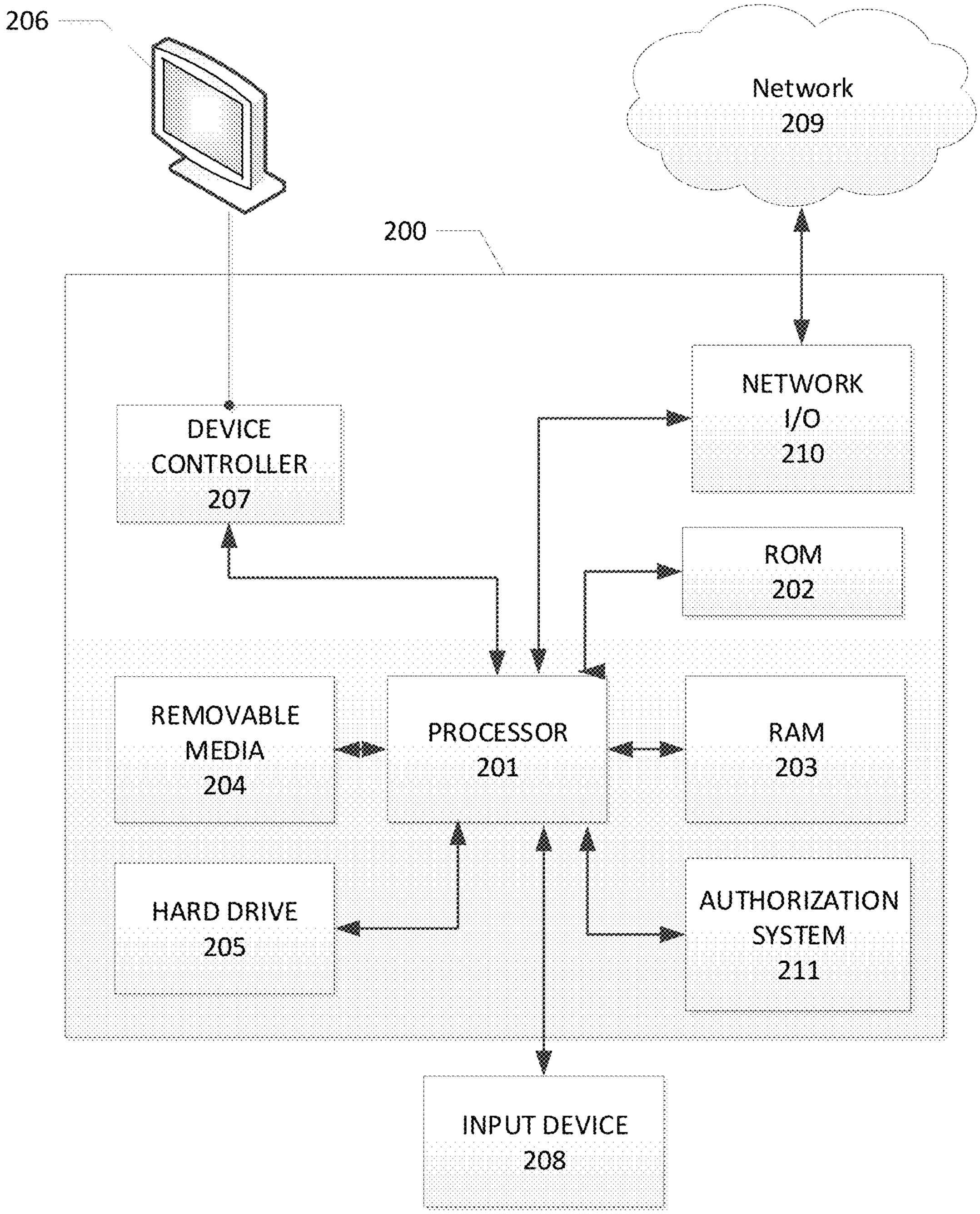
FIG. 2 depicts an illustrative software and hardware device on which various aspects of the disclosure may be implemented.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, solid state memory, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. In some embodiments, the device 200 may include an input device 208, such as a remote control, keyboard, mouse, touch screen, microphone, motion sensing input device, fingerprint reader, iris scanner, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

The device 200 may also include an authorization system 211. The authorization may be comprised of hardware, software, or a combination of the two. In some instances, the authorization system may operate within other elements of device 200, such as the hard drive 205, the processor 201, the ROM 202, or the RAM 203. The authorization system may communicate with network 209 through network I/O interface 210. The authorization system may control authorization and/or authentication with one or more aspects described further herein.

Figure 3:
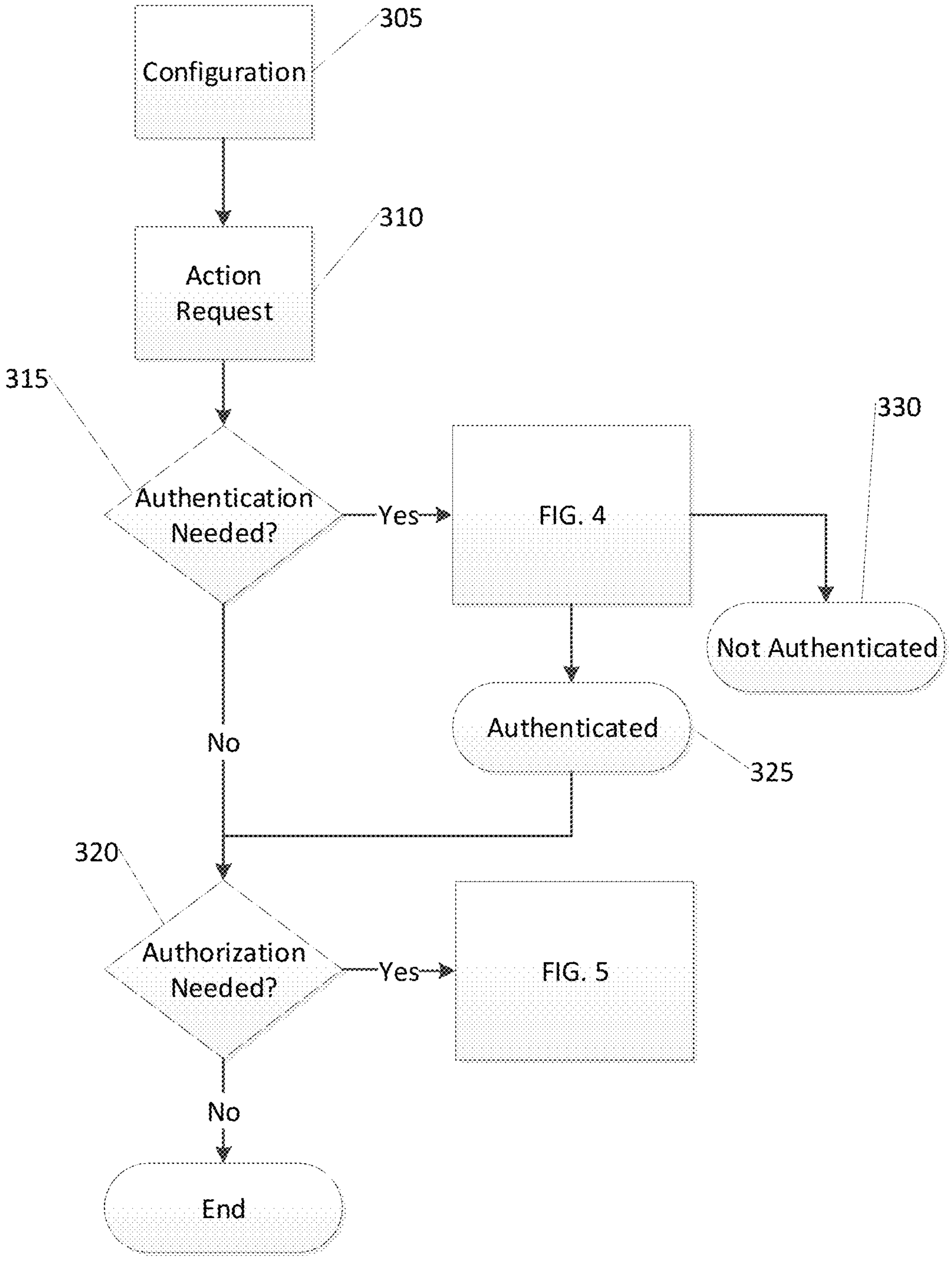
FIG. 3 depicts an illustrative method for authentication and authorization.

Having discussed an exemplary operating environment and computing device, discussion will now turn to an illustrative method for authenticating the identity of the requester and authorizing the requested action as illustrated in FIG. 3. The authorization system 211 of FIG. 2 may implement one or more steps as illustrated in FIG. 3.

FIG. 3 depicts an illustrative process for authentication and authorization. At step 305, an authorization system, such as authorization system 211 of FIG. 2, may be configured. The method may be performed on a computing device, such as a device 200. The computing device may determine an authentication group and/or an authorization group comprising a plurality of members based on an association with a user. In some instances, the user may be an account holder. Such configuration may be done in a variety of ways. In some embodiments, the configuration may be done automatically, such as by identifying individuals associated with an existing social network account of the user. As other examples, the configuration may be done by a system administrator or may be configured by a user interacting with a configuration screen such as the example illustrated in FIG. 11 and discussed further herein. An authentication group may comprise a group of devices or other individuals that may authenticate a requester to verify the identity of someone or something that is requesting a particular action. In many instances, the authentication group may be used to verify the identity of a requester making a request and whether he is a requester for whom the request should be granted.

An authorization group may comprise a group of devices or other individuals who may authorize the requester, or someone acting on behalf of the user, to perform some action. In some instances, different authorization groups may be used for different actions. For example, a request to watch an NC-17 movie may only use a husband and wife as authorizers. In another example, a request to watch a PG-13 movie may use three tiers of people of authorizers.

Members of authentication groups and/or authorization groups may be configured. The association may be made by an administrator, such as an entity operating the computer device, or it may be made by the account holder. The administrator may use records to create associations. Records may include financial data, user profiles, website data, stored communications, or any similar administrative data. For example, records may indicate family or friends associated with the user. In another example, records may indicate members that may be in an entity database that may have some association to the user based on factors, where such factors may include geographic location or social media interactions. For example, an entity database might be a social network or emergency contact information associated with a user.

Action specific information may be configured. Also, the computing device may obtain information describing a request or task to be performed. Using the information gathered, the computing device may determine how to proceed with the action. For example, one task may require a first authorization group, while a second task may require a second authorization group. In some embodiments, each action may have a particular authorization group. In some instances, an authorization group may comprise one or more tiers relevant to a given action. Within each authorization group, there may be one or more individual authorizing members. An authorization group or an authorizing member may be an authorizer for an action request. In some embodiments, different action requests or tasks may have different associated authorization groups within a larger pool of authorizing members. Action requests from different requesters may have different authorization groups. In some embodiments, authorization groups may be broken into tiers. Each tier may comprise a plurality of members. For example, a user may configure an authorization group using a configuration screen such as those illustrated in FIGS. 11-16. In some instances, a list of primary authorizers may be pre-selected by a service provider. For instance, a service provider could identify one or more individuals on an account associated with the service or action, family members notated in user records, other individuals in a geographic area, and/or anyone else known to be associated with the user associated with an action.

In some embodiments, responses from different members and/or tiers in an authorization group may have different weights. For example, responses received from members in a first tier may have a first weight and responses in a second tier may have a different weight. In some embodiments, a tier may comprise a single member, multiple members, or a group of members. In different embodiments, there may be one tier, two tiers, or any number of a plurality of tiers in the authorization groups. Each tier may also be weighted differently. For example, a response from a single member in a primary tier may be sufficient to determine that an action request should be allowed, while more than one response may be necessary for a lower tier. In some embodiments, different authorizers within the same tier may be given different weightings relative to each other. For example, a first authorizer in a first tier saying yes may override a second authorizer in the first tier saying no.

In some instances, authorization for a request may be dependent on context or a threshold. For example, a babysitter requesting a rated R movie may need authorization from a child's parents. As another example, a parent may not need any authorization to purchase $5 soap on an online store. In yet another example, one parent may need authorization from another parent and from three other family members to purchase a car online. Further examples of configuration may be given by FIGS. 11-16.

At step 310, the computing device may receive an action request initiated by a requester. For example, a requester may request to perform an action and trigger an authorization process. For example, a babysitter may attempt to consume content, such as by watching a movie or reading an article on the internet, while babysitting. As another example, the babysitter may attempt to interact with a device in a home, such as changing the thermostat or unlocking a door.

At step 315, the computing device may determine whether authentication of the requesting user is needed for the requested action. The computing device may consult a table to obtain parameters for the requested action. The parameters may include an indication of whether authentication is required for that action, and, if so, what type of authentication is required and/or how it should be done. For example, a requester may have initiated an action request as in step 310. The request to perform an action may require making a request for an authentication, and the requester might be presented with an interface such as that illustrated in FIG. 9. For example, a service provider may send a technician to service a home. The technician may have initiated an action request to enter the home when the user is not there. Before sending a message requesting authorization, the technician may have to authenticate himself with the service provider. The technician may send a picture of himself and a voice sample to an authentication group configured by the service provider. The service provider then may authenticate the technician, allowing the authorization request to be sent to an authorization group configured by the user. In some instances, the interface may be presented on a device on which the action is requested and/or performed, such as a television. In other instances, the interface may be presented on a device associated with an account for the requester. For example, a cell phone app may allow a requester to manage authentication requests on another device. The interface may indicate when an action request has been generated.

As a result of the action request, the computing device may determine that an authentication is needed. The computing device may then proceed to processing an authentication request in FIG. 4. In one instance, the computing device may fail to authenticate the requestor, and deny the authentication request as in step 330. This may terminate the action request. In another instance, the computing device may successfully authenticate the requestor, and confirm the identity of the requesting user as in step 325. For example, a power company may verify that the person trying to enter the home is their employee. If the authentication request is granted, the computing device may then proceed to determining whether authorization is needed for the action at step 320.

At step 320, the computing device may determine whether authorization is needed for the requested action. The computing device may consult a table to obtain parameters for the requested action. The parameters may include an indication of whether authorization is required for that action, and, if so, what type of authorization is required and/or how it should be done. For example, a requester may have initiated an action request as in step 310. As a result of the action request, the computing device may determine that an authorization is required using a table such as that illustrated in FIG. 16. In some instances, the computing device may give a default response. For instance, a request to watch an NC-17 movie may be configured to be denied without requiring any further authorization steps. In another example, a request to change the thermostat may be configured to be allowed without requiring any further authorization steps. In other instances, the computing device may determine that the action may require further authorization in order to make a determination, and process the request according to a method such as the method illustrated in FIG. 5.

Figure 4:
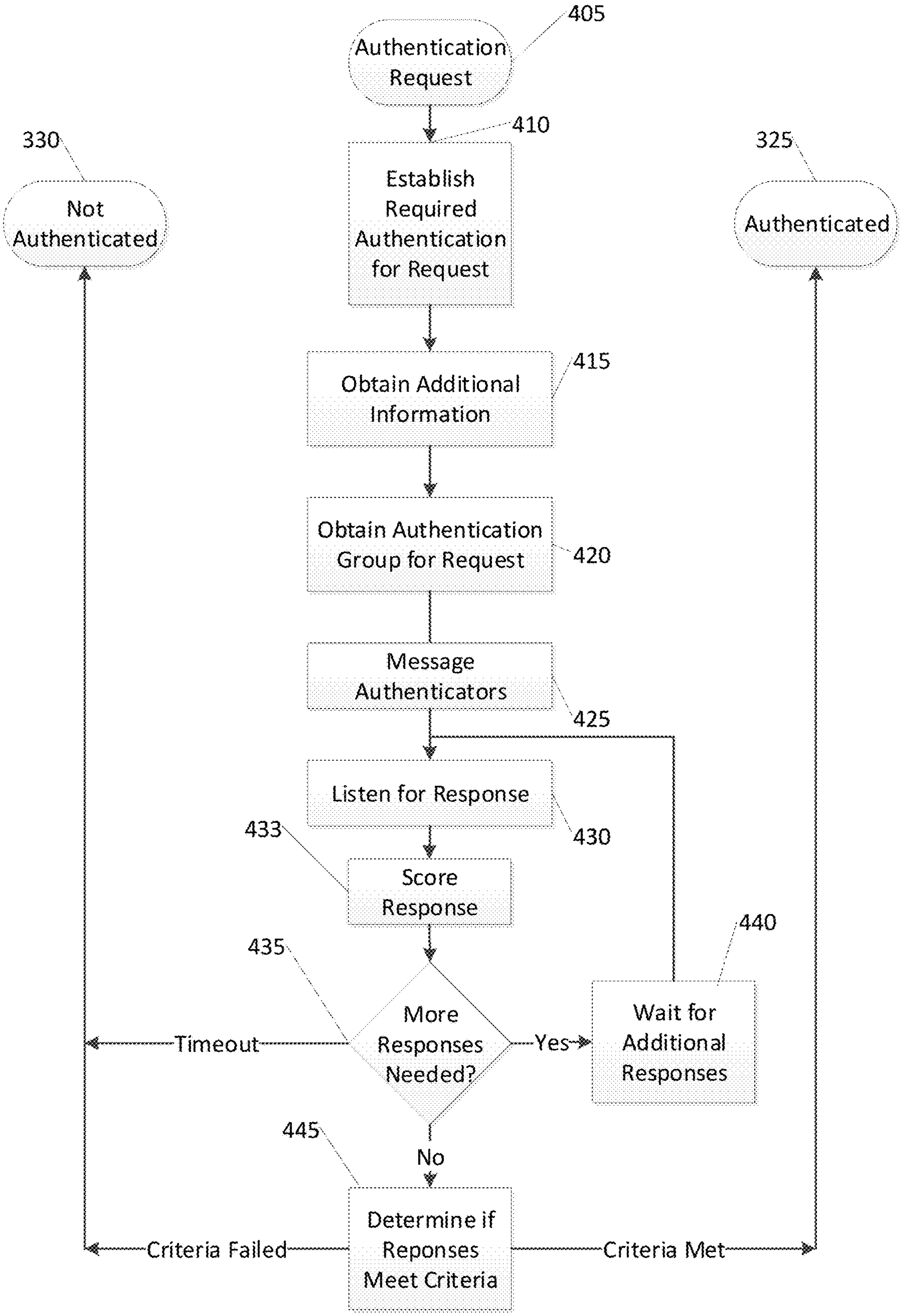
FIG. 4 depicts an illustrative method for authenticating a requestor's identity by members of an authentication group.

Having discussed an illustrative process for authentication and authorization as illustrated in FIG. 3, discussion will now turn to a method for authenticating a requestor's identity by members of an authentication group in FIG. 4.

FIG. 4 depicts an illustrative method for authenticating a requestor's identity by members of an authentication group. The method may be performed on a computing device, such as a device 200. At step 405, an authentication request may be received. For example, an authentication request may be received as a result of the illustrative process illustrated in FIG. 3 at step 315.

At step 410, a computing device may establish required authentication for a request. The computing device may consult a table to obtain parameters for the requested action. The parameters may include an indication of whether authentication is required for that action, and, if so, what type of authentication is required and/or how it should be done. For example, parameters may state that a request to enter the home by an electrician requires authentication by the electrician's company, and three positive responses with no negative responses are required. In another example, the computing device may then proceed to step 415.

Figure 9:
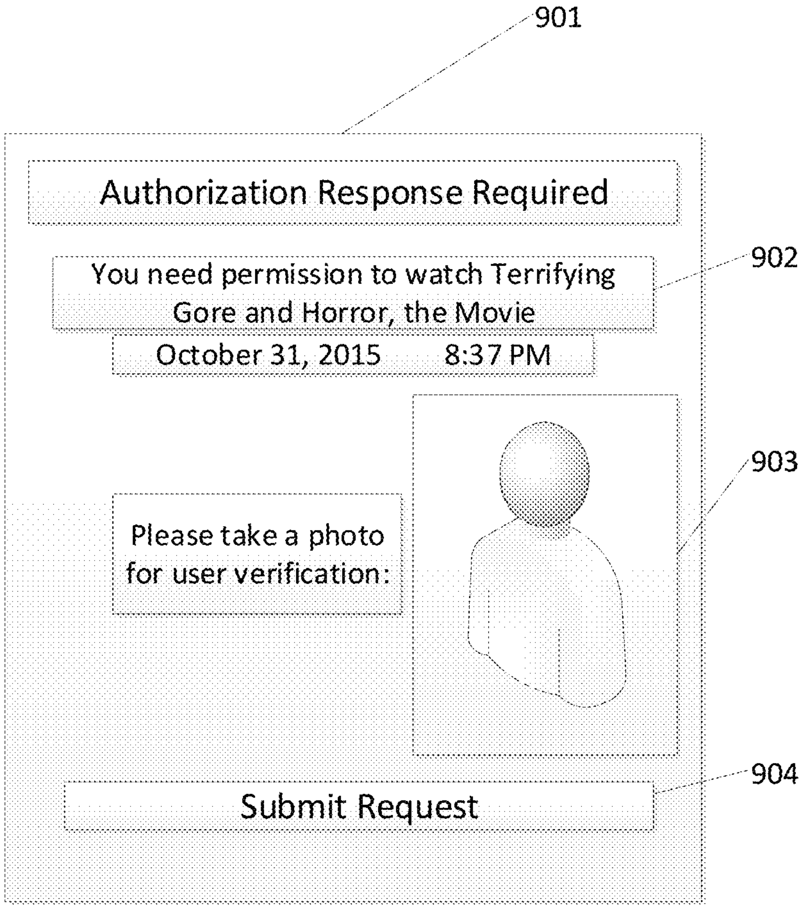
FIG. 9 depicts an illustrative example of an action request screen that might be presented to a requester.

In some embodiments, the action request may include detailed information associated with the requester and/or the requested action. For example, the electrician ringing a doorbell may have provided information on himself and what time he would be coming in advance. However, at step 415, the computing device may optionally obtain additional information associated with the authentication request. In some instances, the information required for an authentication may vary depending on the action. The additional information may comprise contextual information associated with an action requiring authentication. For example, the electrician may have to submit a photo and a password when arriving at the home, which may include a time stamp noting when he arrived. In another example, a cable company may require an employee to provide a photo, scan a company issued ID card, and provide a thumbprint. Further examples of information to be obtained for an authentication may include biometric information (such as a fingerprint, iris scan, audio sample, or photograph of the person), a password, or some other kind of authenticating information. FIG. 9, discussed below, gives further discussion regarding collecting contextual information. Additional information may be obtained from various sources, such as other devices within a user's household, information servers on the internet and/or otherwise accessible by the computing device and from storage associated with the computing device itself, for example. Different information may be required for different actions. In some instances, different actions may be configured to request different information. For example, a request to enter the home may prompt taking a picture of the person on the porch. In another example, a request to make a financial transaction my prompt a request for voice identification.

At step 420, the computing device may obtain an authentication group for a request. Authentication groups are discussed further in FIG. 19. At step 425, a computing device may message one or more authenticators. In some instances, the authenticators may comprise the user. In other instances, authenticators may be authenticating members designated to be part of a first tier of the authentication group. In some embodiments, a message may comprise a data transmission communicated over a network. For instance, a message may be a social networking message sent through the network 209. In another example, messages may be sent via text message.

At step 430, the computing device may listen for a response. In certain embodiments, the computing device may wait for a specified number of responses and/or a specified period of time. For example, the computing device may wait until it receives a response or until 5 minutes have elapsed, whichever comes sooner, before proceeding to step 433. In some instances, the computing device may receive at least one message from at least one member of the authentication group. In some instances, no responses may be received. An example screen for a response may be found in FIG. 10A.

At step 433, the computing device may score a response. The computing device may tally different categories of responses. For example, the device may evaluate a number of "confirm" or "deny" inputs. After scoring the responses, the computing device may then proceed to step 435.

At step 435, the computing device may determine if more responses are needed. For example, the computing device may determine whether the received responses from the authentication group meet an approval threshold. For instance, if the computing device has received a sufficient number of responses, the computing device may move on to step 445 in order to determine if the received responses meet criteria. In another instance, if the computing device has not received a sufficient number of responses, it may choose to wait for further responses, to message additional authenticators, and/or to deny the request. For example, the computing device may continue to wait until sufficient responses are received or a time limit expires. If sufficient responses have not been received, but more responses are outstanding, the computing device may wait for additional responses in step 440 before proceeding back to step 430. In another instance, if sufficient responses have not been received, and there are no more outstanding responses or a time limit has expired, the system may choose to simply deny the request as in step 435.

At step 445, the computing device may determine if responses meet one or more criteria for authenticating the identity of the requestor. For example, a system may evaluate responses against an approval threshold and transmit an authentication response to a requesting device based on that determination. Any suitable criteria may be used. For example, the system may check to see if a plurality of authorizers who were messaged responded with "confirm" indications. In another example, the device may check to see if any authenticators responded with "deny" indications. In another example, the device may check to determine whether more authenticators responded than did not response before judging the received responses. An account holder could configure their own rule, and the device may implement one or more account holder configured criteria. The approval criteria may be used to determine whether an approval threshold is satisfied. If the device determines that the approval criteria are met, the device may grant authentication for the requested action as in 325. If the device determines that the approval criteria are not met, the device may deny authentication for the requested action as in step 330. In some embodiments, individual criteria of the one or more criteria may have a priority and/or condition associated with it, and some criteria may indicate circumstances in which they are triggered or altered. For example, criteria requiring multiple positive responses may be triggered for any financial transaction over $100. In another example, entrance to a home may require at least three positive responses.

Figure 5:
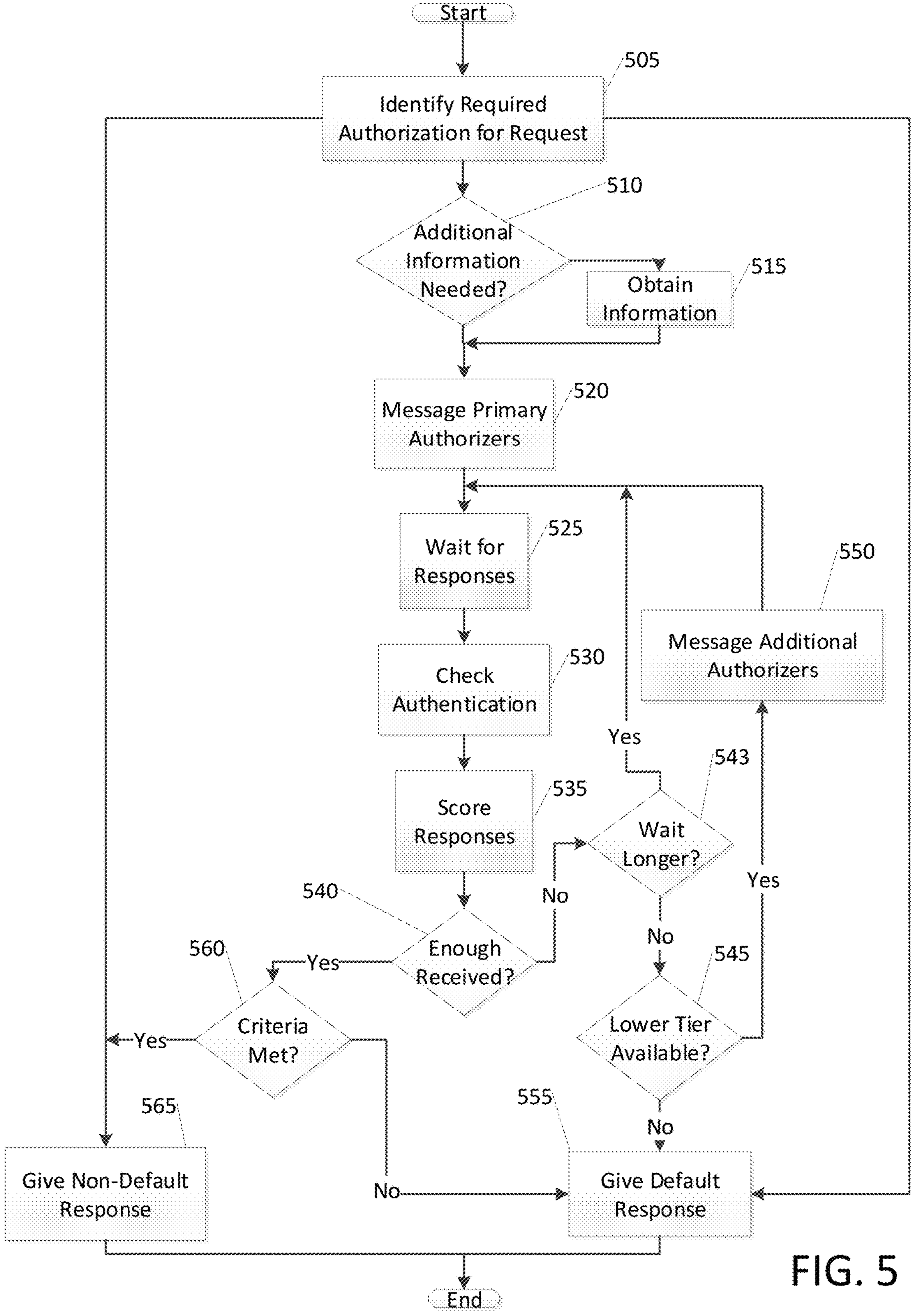
FIG. 5 depicts an illustrative method for processing an authorization request.

Having discussed obtaining authorization approval from members of an authentication group as in FIG. 4, discussion will now turn to depicting an illustrative method for processing an authorization request in FIG. 5.

FIG. 5 depicts an illustrative method for processing an authorization request. The method may be performed on a computing device. At step 510, the computing device may determine that additional information may be required to process the request. For example, the computing device may request contextual information regarding the task. For example, a requester may be asked to supply a reason for the request. In some embodiments, the computing device may request information from devices or services. For example, the computing device may wish to know the status of a security system, and may check to see if a door or window has been opened at step 515. As another example, the computing device may obtain information from a user account in step 515 to provide context for the action. In another example, the computing device may obtain any additional information at step 515, such as financial records, that may assist the authorization group in making an authorization decision.

At step 520, a computing device may message primary authorizers. For example, the computing device may send a set of messages to a plurality of members in the authorization group. The messages may comprise various pieces of information. In some instances, the messages may include any information obtained in steps 505, 510, or 515. For example, a photo provided by a requester may be included in the message to the authorizers. Some authorizers may be allowed to see some information that others may not be allowed to see. For example, a user's spouse may be allowed to view private information, such as a bank statement, when the user is the requester, but the user's friends may not be allowed to receive that private information. In some embodiments, a set of messages may be sent that comprise a request to verify an identity of the requester. In some instances, an action may be of a type where the action may be authorized once the requester is verified as being the person the requester may claim to be. For example, a home owner may ask to unlock the front door. The system may perform an authorization process, in that case, to ensure that the requester is authorized to enter the home. In some instances, messages may comprise contextual information about the action. For example, an authorizer may be informed of the Entertainment Software Rating Board (ESRB) rating of a movie, as depicted in FIG. 10B. The authorizer may then make a determination of whether to authorize the action at least in part on the information.

At step 525, a computing device may receive responses. For example, the computing device may receive at least one message from at least one member of the authorization group. In some instances, no responses may be received. In some instances, the responses may come from different tiers. For example, after failing to receive enough responses from a first tier, a second tier may have been messaged. While receiving responses from the second tier, a response from the first tier may be received.

At step 530, a computing device may authenticate the responses. In some embodiments, the responses may be checked to ensure that the identity of the authorizer has been authenticated. For example, an authorizer in a first tier may be sent a message. When responding to the message, the authorizer may input a passcode. The computing device may check the passcode to ensure that the response was actually generated by the intended authorizer. As an example, a babysitter may request to watch a rated R movie. The computing device may send a message to a parent on a mobile phone. If the mobile phone had been left at home, the babysitter may be able to authorize herself. By requiring the authorizer to enter a passcode, it may help to ensure that the proper authorizer may be responding, and may help to prevent attempts to defeat authorization measures employed by the system.

At step 535, a computing device may score responses. In some embodiments, the computing device may evaluate an initial batch of "yes" responses against "no" responses according to rules. Rules may set a percentage of "yes" responses required to authorize an action. Rules may also be more complicated, and may determine a score based off of a formula. For example, the computing device may assign a first weight to responses received from members of a first tier and assign a second weight to responses received from members of a second tier. For example, the computing device might count the responses from the second tier as being worth double those from the first tier.

At step 540, a computing device may determine if enough responses have been received. For example, the computing device may receive a first response from at least one authorizing member in a first tier of the authorization group. After a predetermined period of time, the computing device may determine whether the first response may be sufficient to determine whether to approve the authorization request. If the first response is not sufficient to determine whether to approve the authorization request, the computing device may send an auxiliary set of messages to a second tier of the authorization group. Then, the computing device might receive a second message from at least one second authorizing member in the second tier of the authorization group. In some embodiments, an authorization group might comprise a plurality of tiers. The computing device might message primary authorizers who might comprise authorizing members in a first tier. If sufficient responses are received from the first tier, then the computing device may choose to evaluate the criteria, such as in step 560. If insufficient responses are received, then the computing device may determine if a lower tier is available, such as in step 545.

At step 545, a computing device may determine that a lower tier may be available. For example, after receiving an insufficient number of responses from a first tier, a second tier might be available. If the second tier sends an insufficient number of responses, the computing device might try a third tier. When trying a new tier, the computing device may proceed to step 550, and may initiate a loop as shown in FIG. 5 when responses are received. This loop may be repeated until there are no lower tiers in the authorization group available, or until a triggering condition may be met. For example, the computing device may not move to a lower tier if the action request is more than an hour old. If a lower tier is not available, then the computing device might give a default response such as in step 555.

At step 550, a computing device may message additional authorizers. For example, a computing device may send a first message to a first authorizing member in a first tier of an authorization group and a second message to a second authorizing member in a second tier of the authorization group. For instance, the first tier may be primary authorizers. The second tier may be additional authorizers. After receiving responses from the first tier, the computing system may make determinations, such as in steps 540 and 545, that a lower tier may be required. The second tier may then be messaged as additional authorizers. Then, responses from the additional authorizers could be received, and the process may continue back at step 525.

At step 555, a computing device may give a default response. The default response may represent the desired result when the system may be unable to properly resolve an authorization. In some instances, the computing device may be configured for a situation where approval should be granted unless authorizers deny approval. For example, a default response for a rated-R movie might be to block the movie, while a default response for a PG-13 movie might be to allow the movie. In another example, family members may receive alerts when a teen wants to make a purchase online, and if they do not respond to deny the purchase (or respond allowing it), the purchase may be allowed.

At step 560, a computing device may evaluate one or more approval criteria. For example, the computing device may decide whether to approve an authorization request based on one or more approval criteria. In some embodiments, after a sufficient number of responses have been received, the computing device may evaluate the received responses against the one or more approval criteria. In some embodiments, the computing device may determine that the approval criteria requires further positive responses in addition to the at least one message and transmit a message denying the authorization request by sending a default response at step 555. In some embodiments, the computing device may determine that the approval criteria does not require further positive responses in addition to the at least one message and transmit a message approving the authorization request by sending a non-default response at step 565. In some embodiments, meeting the approval criteria may result in a non-default response that permits authorization, and failing to meet the approval criteria may result in a default response that denies authorization.

At step 565, a computing device may give a non-default response. The non-default response may be the opposite response of the default response discussed above. For example, if the default response for ordering a content item is to deny the content item, the non-default response may be to permit the content item. In another example, if the default response for viewing a content item is to permit the content item to be viewed, the non-default response may be to block the content item. In some instances, an action may be permitted until overruled. For example, a content item may be able to be viewed, unless the computing device determines that a non-default response blocking the content item should be given.

Figure 6:
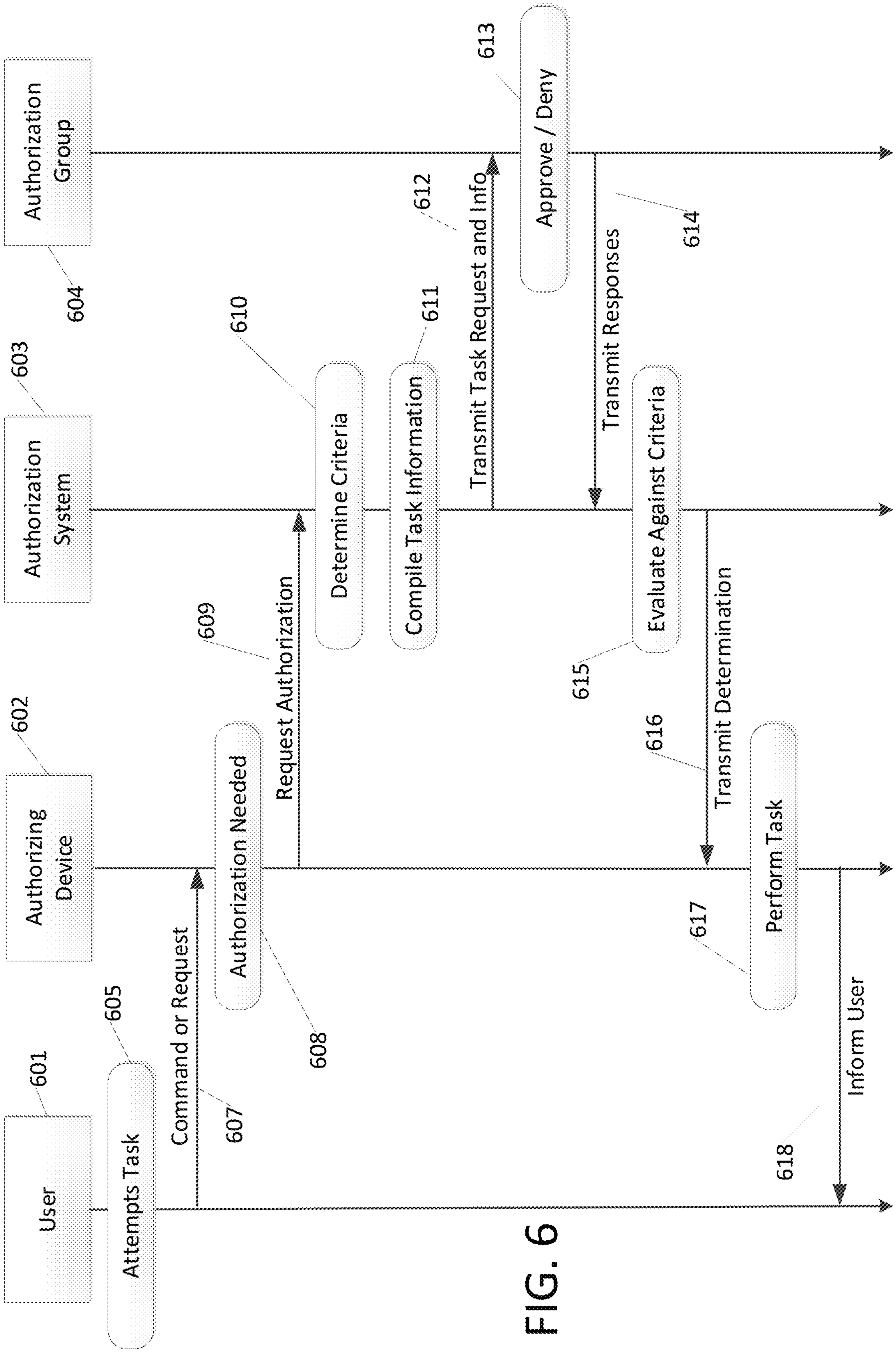
FIG. 6 depicts an illustrative process flow demonstrating an interaction between different entities that may perform an authorization.

Having discussed an illustrative method for processing an authorization request as in FIG. 5, discussion will now turn to an illustrative process flow for different entities interacting in order to perform an authorization process in FIG. 6.

FIG. 6 depicts an illustrative method for different entities interacting in order to perform an authorization. At step 605, a requester 601 attempts a task. For example, a requester may attempt to view a content item. The requester enters a command or request 607 on an authorizing device 602 to attempt the task. For example, the requester may select a content item using a remote control. At step 608, the authorizing device 602 may determine that an authorization may be needed for the requested action. At step 609, the authorizing device 602 may submit the authorization request to an authorization system 603. At step 610, the authorization system 603 may determine one or more approval criteria for authorizing the requested action. At step 611, the authorization system 603 may compile task information. For example, the authorization system 603 may compile information related to the task, contextual information related to the task, information stored in a server relating to performing an authorization, or any other task information that may be relevant to the authorization system 603. For example, information related to the task may include the name of a requester, the action to be authorized, the state of authorization equipment, or some similar information. Contextual information may include the time of day, the location of a requester or a device, the status of a home security system, a network status, or the status of a social media network. A server may store information such as biometric information for a requester, information related to previous requests, software to be run on the server, or any other such information. Task information may include lists of authorizers or members of authorization groups, devices to be authorized, information on criteria, configuration information, or any other such information. At step 612, the authorization system 603 may transmit the task request and information to an authorization group 604. For example, the authorization system 603 may transmit a photograph of the requester 601 and contextual information related to the task. In some instances, the information transmitted may resemble FIG. 10A or FIG. 10B. At step 613, the authorization group 604 may approve or deny the request. For example, one member may approve the request, and another may deny it. At step 614, the responses from the authorization group 604 may be transmitted to the authorization system 603. In some instances, steps 612, 613, and 613 may be repeated multiple times. For example, there may be multiple authorizing members within a group, or multiple tiers in the group containing multiple authorizing members. At step 615, the authorization system 603 may evaluate received responses and/or other compiled information against criteria. At step 616, the authorization system 603 may transmit a determination based on the criteria to authorizing device 602. At step 617, the authorizing device 602 may perform a task based on the determination. For example, the authorizing device 602 may perform the task attempted by the requester, or it may perform some other task, such as denying the attempted task. At step 618, the authorizing device 602 may inform the requester regarding the result of the authorization process. For example, the authorizing device 602 may cause information to be displayed to the requester explaining whether or not the attempted task may be performed. Also, the authorizing device 602 may inform the requester of the process or results from any of the proceeding steps. For example, the authorizing device might display a user interface to the requester and/or user stating that the request has been granted. In another example, a notification may be given to the requester and/or user through a service, such as a social media network.

Figure 7:
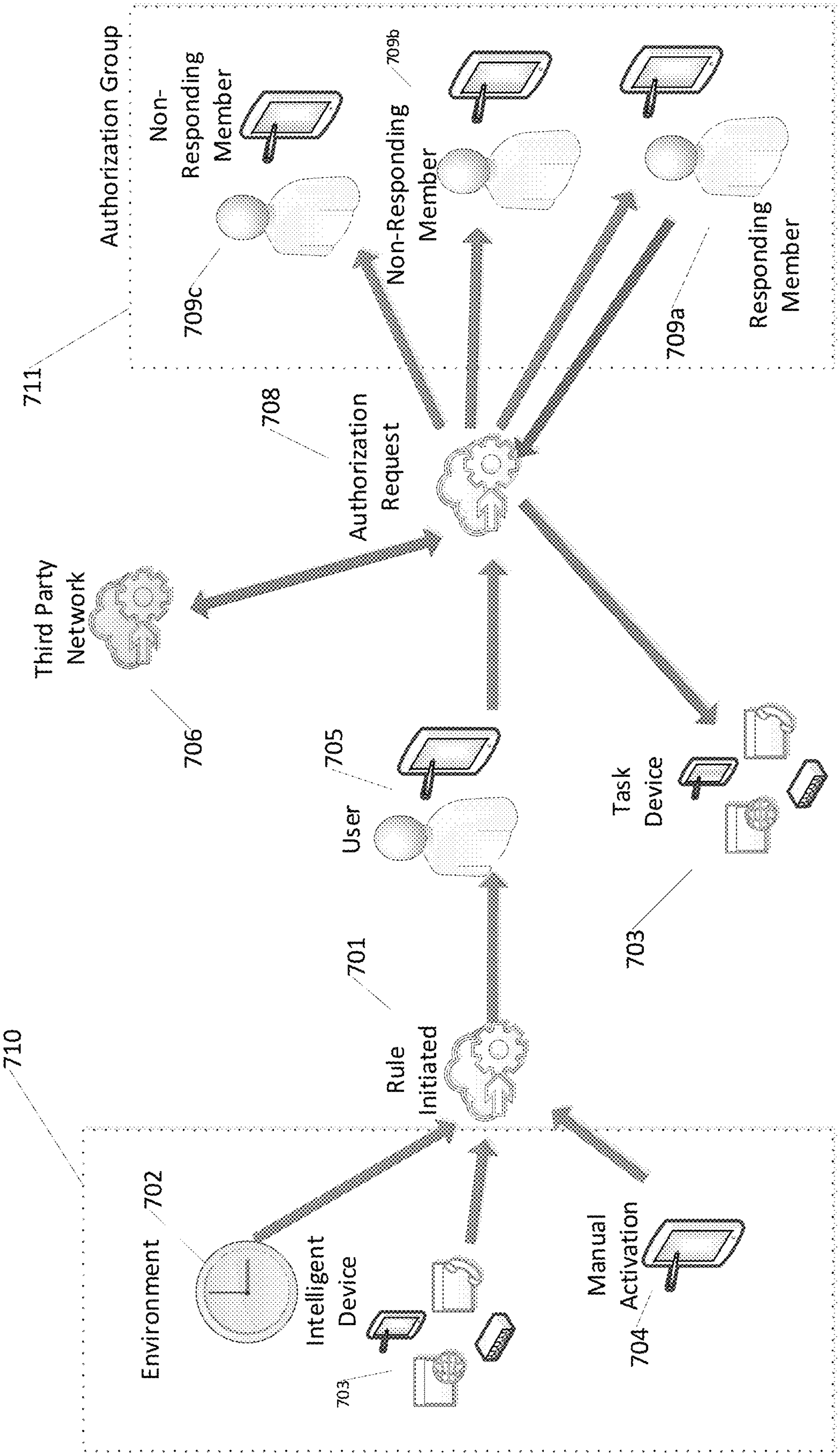
FIG. 7 depicts an illustrative environment demonstrating exemplary inputs into an authentication request.

Having discussed an exemplary method for different entities interacting in order to perform an authorization as in FIG. 6, discussion will now turn to an illustrative environment demonstrating exemplary inputs into an authorization request in FIG. 7.

FIG. 7 depicts an illustrative environment demonstrating exemplary inputs into an authorization request. In some embodiments, authorization triggers 710 may activate an authorization 701. For instance, the environment 702 may activate an authorization. For instance, an action may require an authorization according to a schedule. For example, an action may need to be authorized from 5 PM-10 PM. In other instances, a sensor in the environment may require an action to be authorized according to a temperature, a time of day, a location, or any other status. Such statuses may be the result of software, or come from a device such as a home security system. In some instances, an intelligent device 703 may activate an authorization. For example, a video camera may identify a person at the door, a set top box may identify preferences, or a device, such as a set to box, performing a data operation (such as a full hard disk) may necessitate an action (such as deleting a recording). In some instances, authorizations may be activated manually as in 704. For example, an account holder may create an authorization, using a configuration screen such as that exemplified in FIG. 11. The user then might enable or disable that authorization using a toggle. Using one or more of these inputs, or some other input, the system may initiate a rule at 701 to be managed by the system.

At 705, a requester makes a request based off the activated authorization 701. In some embodiments the requester may be a person, but a requester could also be some sort of service or intelligent device. The requester could then create a request that may be sent to be processed at 708. In some embodiments, the request may be generated by a device acting as a requester, such as a set top box, smartphone, tablet, thermostat, garage door opener, or any other device with the ability to call to a predefined protocol or service supported at 708.

The authorization request may trigger messages to an authorization group 711. Messages may include an indication of whether an authentication has been performed for the action, and may indicate whether the authentication was successful. The authorization request may go to non-responding members 709*b* and 709*c*. The request might also go to a responding member 709*a*, who sends a response back to be processed at 708. The authorization request may also generally message a third party network 706 without specifying particular members. The third party network may comprise a network supporting standard interfaces such as Oauth. Either 711 or 706 may make use of an existing social network. For example, an authorization message may be sent through Facebook, Twitter, SMS, or some other service to the authorization group 711.

Based on the result from processing the request at 708, the results may be returned to a task device 703. The task device may then take some action based off of the results.

Figure 8:
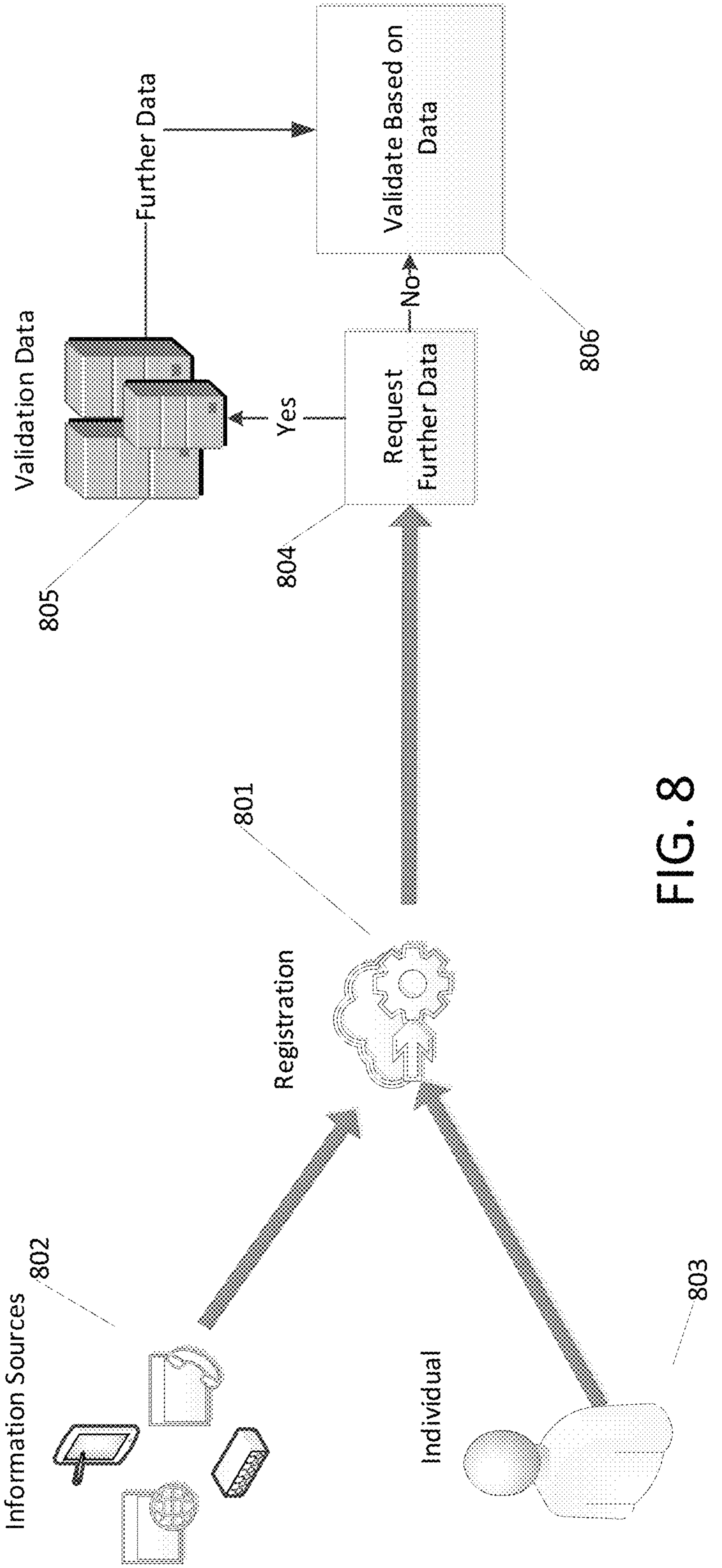
FIG. 8 depicts an illustrative environment demonstrating how identifying information might be collected by the system to register an individual.

Having discussed an illustrative environment demonstrating exemplary inputs into an authorization request as in FIG. 7, discussion will now turn to an illustrative environment demonstrating how identifying information might be collected by the system to register an individual in FIG. 8.

FIG. 8 depicts an illustrative environment demonstrating how identifying information might be collected by the system to register an individual. Within the context of FIG. 8, an individual could be anyone providing or requiring authentication, such as an authorizing member, a user, or a requester. In some embodiments, a registration system 801 may collect information about an individual to authenticate that individual. In some embodiments, information sources 802 may include some outside entity that has collected information about an individual's identity. For example, a passport agency may have registered an individual with the system, and have information such as documents, photos, thumbprints, vocal recordings, or other information that might help authenticate the individual. The individual 803 might also supply information. For example, the individual might supply a photo, a password, or a security question to aid in authentication.

In block 804, a computing device in an authentication system may determine whether to request further data regarding the individual. For example, sufficient information may have been received at a registration system 801 from information sources 802 and individual 803 for the computing device to be satisfied that the individual can be authenticated. In some instances, the computing device may determine whether to obtain more information, or may check the information gained from the registration system 801 against other information. At block 805, the system may acquire validation data and/or additional information to further validate and/or authenticate the individual 803 who attempted to register with the registration system 801. For example, an interview could be scheduled with the individual to ensure that the information gained at the registration system 801 matches the individual. For example, a thumbprint could be collected and checked against thumbprints obtained from the information system 802 and individual 803. At block 806, a computing device in the authentication system may decide whether or not to validate the individual based off any information that may have been obtained by the registration system 801 and/or further information obtained at block 804 by the computing device.

Figure 10A:
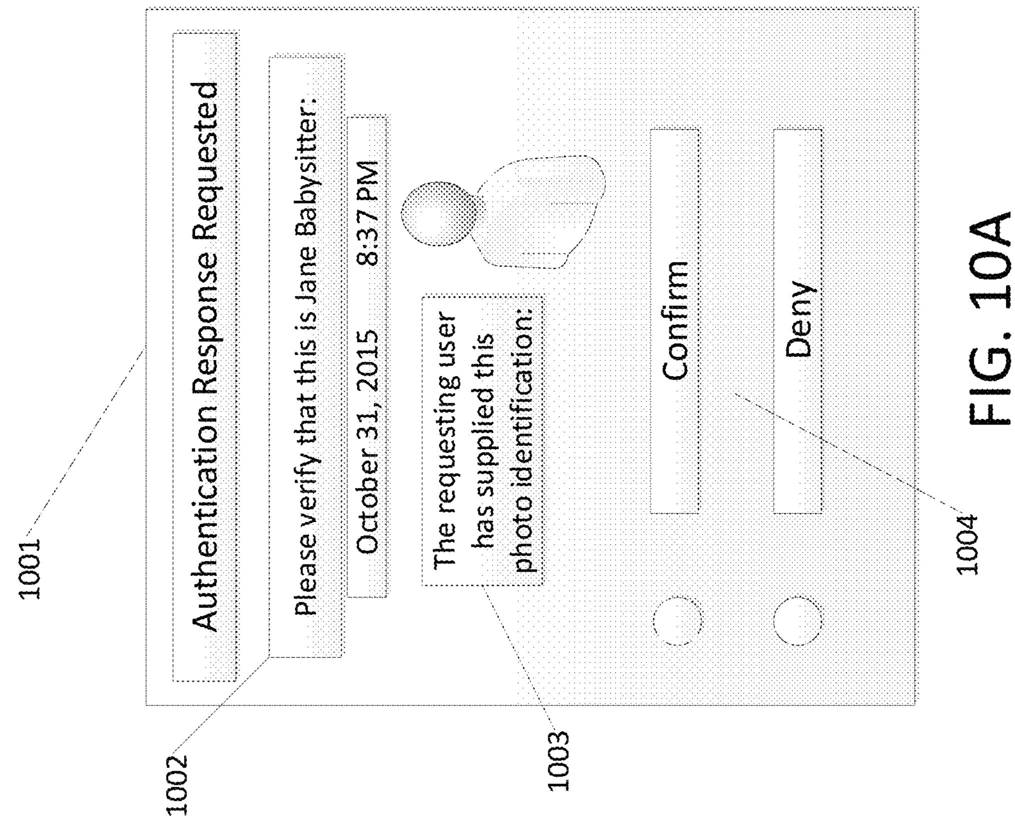
FIG. 10A and FIG. 10B depict illustrative examples of action request screens that might be presented to an authenticating member.
Figure 10B:
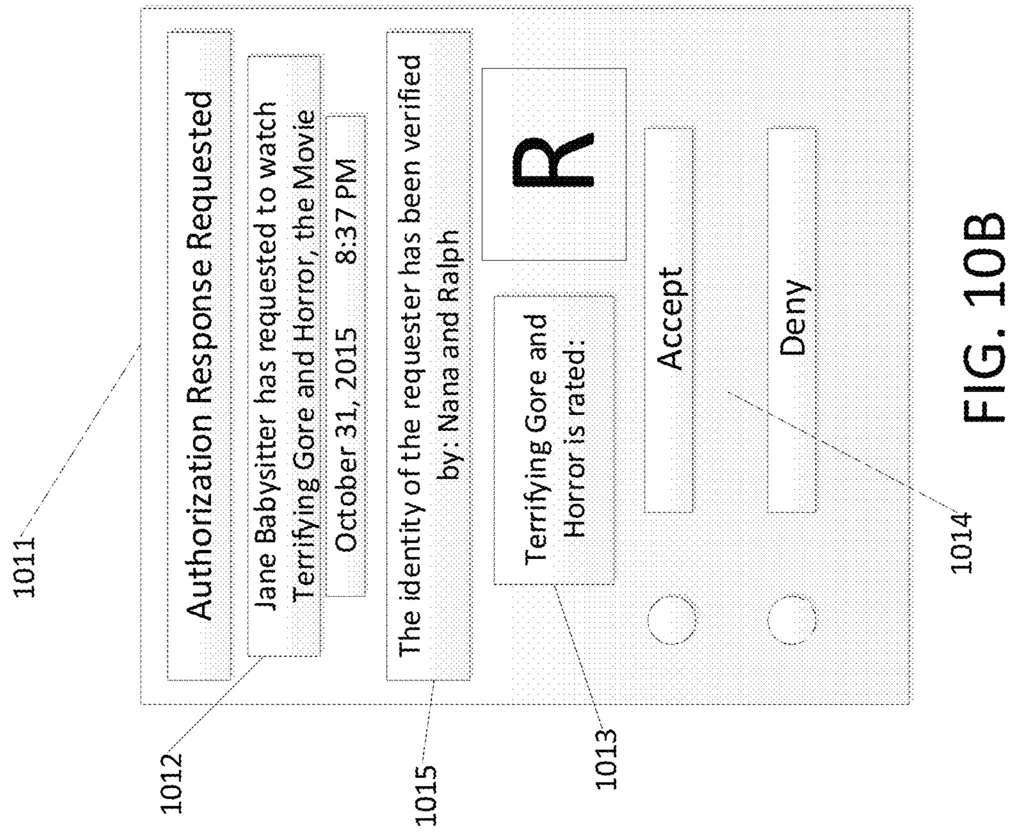

Having discussed an illustrative environment demonstrating how identifying information might be collected by the system to register an individual as in FIG. 8, discussion will now turn to illustrative examples of action request screens that might be presented to an individual in FIG. 9, FIG. 10A, and FIG. 10B.

FIG. 9 depicts an illustrative example of an action request screen that might be presented to a requester when the requester requests an action. The action request screen may be presented to the requester on a device making a request, or on a device that interfaces with the requester such as a smartphone, tablet, computer, or set top box. A requester might be presented with a screen 901 that may inform the requester that authorization may be required. The screen may present information 902 informing the requester with a short description regarding why authorization may be required for the requested action, and contextual information such as the date or time. Contextual information may vary depending on an action. For example, a request to authorize watching a movie may prompt information about the movie and its ratings. For example, an IMDB parental guidance datasheet might be provided. The requester may be prompted by prompts 903 to supply information that may be used to authenticate the requester making the request. The additional information that is required may vary depending on the action. For example, entry into the front door may require a photo. In some instances, additional information might be requested by an authorizer. For example, if an initial request to unlock a door was made at midnight, an authorizer might request the requester to re-submit a request with a photo of himself. The requester may then be given the option 904 to choose whether to submit the request.

FIG. 10A depicts an illustrative example of an action request screen that might be presented to an authenticating member, or an individual who is empowered to verify the identity of a requestor. For example, in the case of an electrician, the authenticating member may be an employee in the dispatch office of the electrical company. In response to an action request, an authenticating member may be presented with a screen 1001, notifying them that the requester has requested an action and that an authenticating response has been requested. The screen may include details about the request 1002, which may include both information specifying the request made and contextual information about the request. The screen might also display information provided to authenticate the requester making the request in the form of a picture and/or message 1003. This may aid the authenticating member in determining that the particular entity making a request is who he claims to be. The authenticating member may be given options 1004 on whether to confirm or deny the requestor's identity. The authenticating member may click confirm or deny to indicate their response to the action request. The corresponding confirmation or denial might then be sent to a computing device as the response from the authenticating member.

FIG. 10B depicts an illustrative example of an action request screen that might be presented to an authorizing member. In response to an action request, an authorizing member may be presented with a screen 1011, notifying them that the requestor has requested an action and that an authorization response has been requested. The screen may include details about the request 1012, which may include both information specifying the request made and contextual information about the request. The screen might also display information provided to authorize the requester making the request in the form of a picture and/or message 1013. There may also be an indication 1015 as to whether the requester has been authenticated. This may aid the authorizing member in determining that the particular entity making a request may be authorized to perform an action. For example, the screen may present that an authenticated individual has requested to watch a movie, along with the ESRB rating for the movie. The authorizing member may be given options 1014 on whether to confirm or deny the requestor's identity. The authorizing member may click confirm or deny to indicate their response to the action request. The corresponding confirmation or denial might then be sent to a computing device as the response from the authorizing member.

Figure 11:
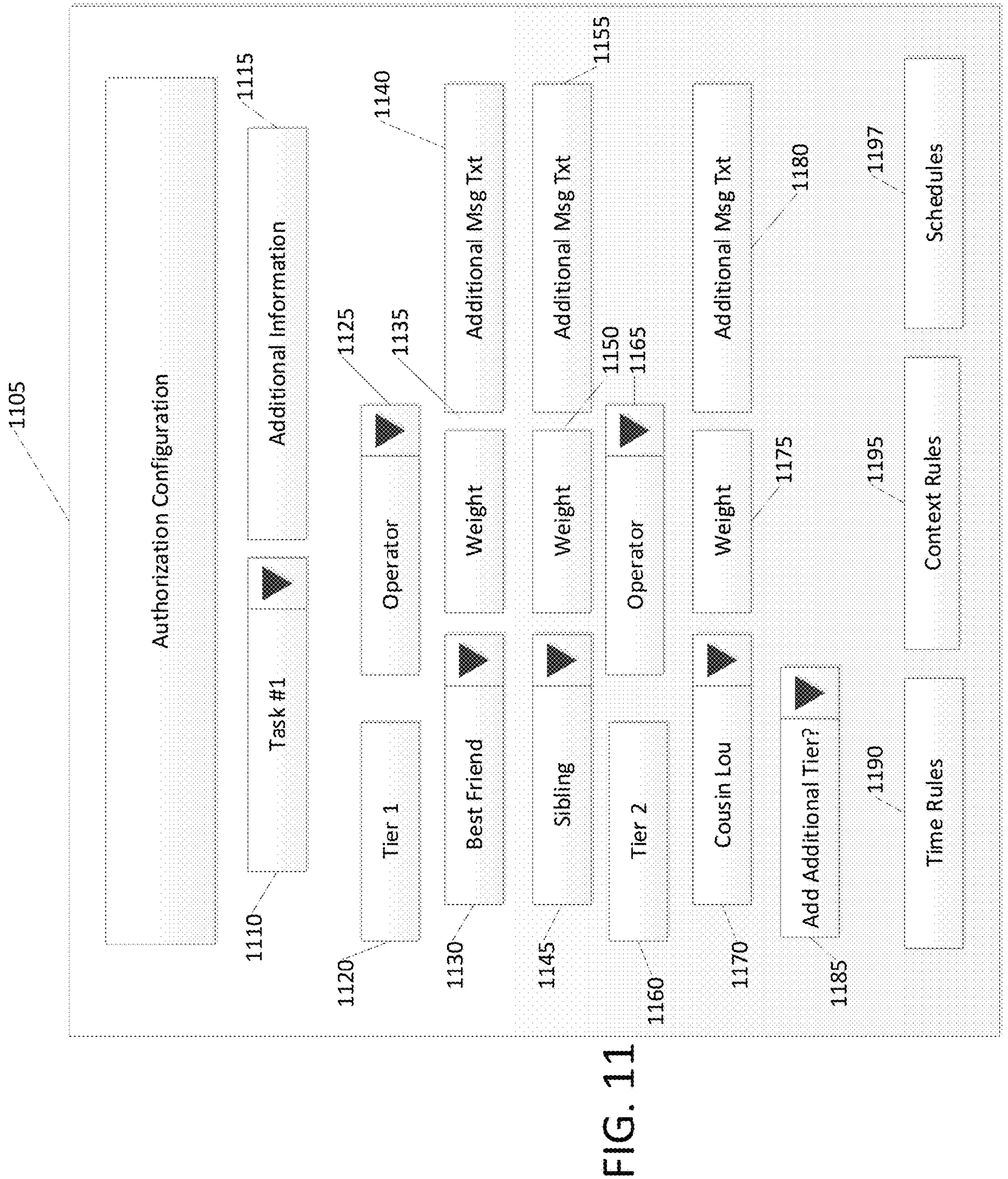
FIG. 11 depicts an illustrative example of an authentication configuration screen.

Having discussed illustrative examples of action request screens that might be presented to an individual in FIG. 9, FIG. 10A, and FIG. 10B, discussion will now turn an illustrative example of an authorization configuration screen in FIG. 11.

FIG. 11 depicts an illustrative example of an authorization configuration screen. An account holder may be presented with a screen 1105. The screen may present the account holder with a number of options to configure tasks or actions to be authorized. An account holder may select from a plurality of available tasks, or create a new one, at task name field 1110. In some embodiments, default tasks may be given. For example, there may be a purchases category, including default setups for a VOD rental task and a credit card purchase task. In another example, there might be a home security setup, with a task for turning off or on lights, changing the temperature, or opening a garage door. In another example, there might be default tasks for more esoteric tasks. For instance, a records setup could be used for medical records. In another instance, a custom setup might present a user with optimal defaults for creating custom settings.

An account holder may configure additional information about the task at information field 1115. For example, the account holder may input information about the task. In another example, the account holder might configure or view information collected from other sources. An account holder may enter information for a first tier member at tier name field 1120. An account holder may specify an operator at operator field 1125, such as an operator specifying what rules should be applied in creating criteria for evaluating responses. For instance, a user might specify that all tier 1 members must respond. In another instance, a user might specify that a plurality of responses must be positive.

An individual authorizing member may be configured at member name field 1130. An authorizing member may be entered by a user here, or pulled from other sources. For example, a service provider may have already gathered information that may aid in identifying potential authorizing members. For example, a service provider might have records of individuals that have interacted in applications. In another example, phone records, text messages, voicemails, or contact lists might supply authorizing members associated with a user. In another example, e-mails could be analyzed to identify authorizing members. Services could also be analyzed for information, such as user accounts in Video On-Demand, Digital Video Recording (DVR), or web access. Information could also be gathered from third party sources. For example, information could be gained from public records regarding a high school class, people in a geographic area, or in a household. Information gathered may be ranked in order of relevance. For example, user accounts on a DVR might be ranked heavily in an action to record content, while phone records might be used in suggesting an individual to notify for an unlocked door. In some embodiments, rankings might be made according to different levels. For example, potential authorizers might be ranked high, medium, or low. Suggested authorizers to be used as authorizing members in a group might be listed proportionally amongst rankings. For example, an account holder might be presented with 30 high, 10 medium, and 5 low contacts, regardless of how many may be present within each ranking.

A weight may be given at a weight field 1135 corresponding to the authorizing member at member name field 1130. The weight may indicate the relative strength of the response versus other members. Additional text for the member may be given at a member message field 1140. The Additional text field may be a space where a user may enter a message to be displayed to the member when receiving an authorization request. A second authorizing member "sibling" is given at" a second member name field 1145. A different weight could be given at a second member weight field 1150, such that the responses from the member name field 1130 and second member name field 1145 do not count the same. Further, individual text at a second member message field 1155 could be made specific for the member referenced by second member name field 1145 and different from the member referenced by the member name field 1130. In some embodiments, authorizing members could be added by adding a social network, such as Google, Facebook, Twitter, or such. In some embodiments, authorizing members might have a time to live, so that a member may be removed from the authorization group after a certain period of time. For example, a renting neighbor may be added to the first tier for a task allowing entry into a home with a time to live of one year, so that the neighbor is not inadvertently left with the ability to allow entrance to the home after the neighbor moves out. In some embodiments, members could be selected at random or in a pattern from a pool of possible members. In some embodiments, authorizing members might be selected from a graphical listing. For example, an account holder may be presented as a cluster diagram, with potential members with the highest level of association grouped around the user in the center.

A second tier could be added at additional tier name field 1160. An operator could be applied at additional operator field 1165, which may differ from an operator in another tier, such as the first operator at operator field 1125. An additional authorizing member 1170 in an additional tier may have an additional weight 1175 and additional message field 1180 similar to a member in the first tier. Any number of additional tiers may be added at additional tier field 1185.

Other settings could be configured. For instance, time rules could be configured by accessing time rules menu 1190. For example, an account holder could configure an authorization request to fail after one hour if insufficient responses have been received. In another example, an account holder could configure an authorization system to send messages to a first tier, wait 30 minutes, and send messages to a second tier if no responses have been received. Context rules could also be configured by accessing context rules menu 1195. In some instances, context rules might establish triggers for activating an authorization. For example, an action request to unlock a door might only trigger if a security system indicates that no one is in a home. Conditions may be based on the lock/unlock status of doors or windows in the home. For example, a request to unlock a door might not be required if at least two other exterior doors are unlocked. In another example, a request to make a credit card purchase might increase the number of positive responses required based on the amount of a transaction. Schedules might also be configured by accessing schedules menu 1197. For example, an authorization might be configured to unlock a door only from 8 AM until 5 PM while a homeowner is at work. In another example, a different set of rules for viewing content might be applied from 5 PM until 9 PM while children are awake and watching television.

Having discussed an illustrative example of an authorization group configuration screen as in FIG. 11, discussion will now turn illustrative examples of device configuration in FIG. 12, FIG. 13, FIG. 14, and FIG. 15.

Figure 12:
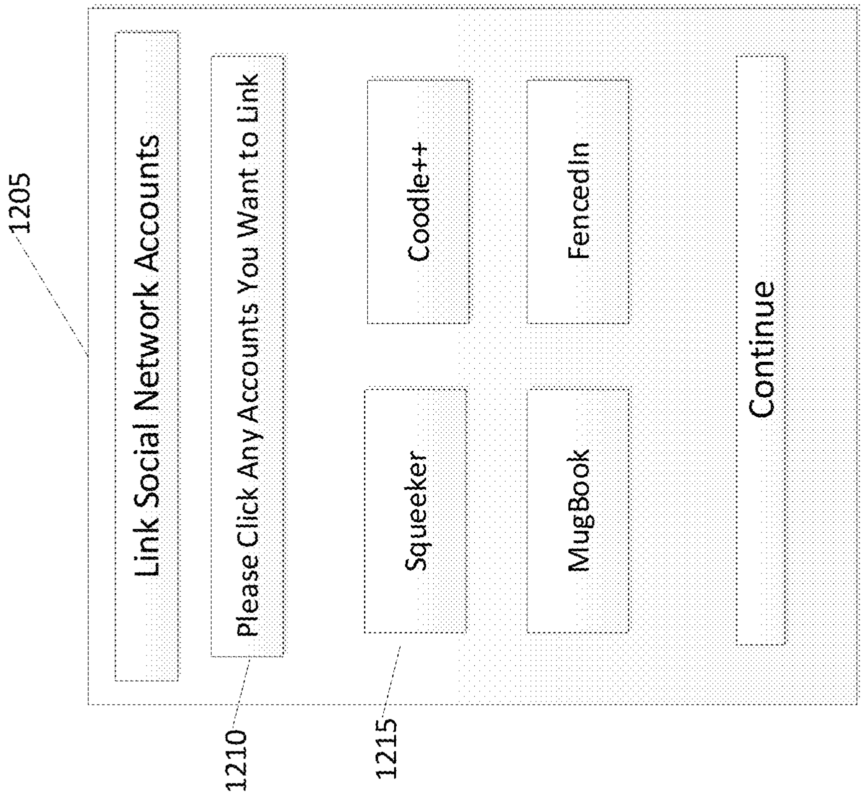
FIG. 12 depicts an illustrative example of a configuration screen that may be presented to a user for linking services.

FIG. 12 depicts an illustrative example of a configuration screen that may be presented to a user for linking services. Screen 1205 present a user with a step asking the user to link various services. Information 1210 may give the user helpful information for linking services For example, the user may be allowed to select only what they choose to link. The user may be presented with accounts 1215 which they can link. Those services may include user accounts, such as an account with a service provider, or social networking accounts. The links may pull up configuration pages involving those services. In some instances, the configuration pages may be managed by the services. For example, clicking on Squeeker may pull up a web page run by Squeeker for linking the service.

Figure 13:
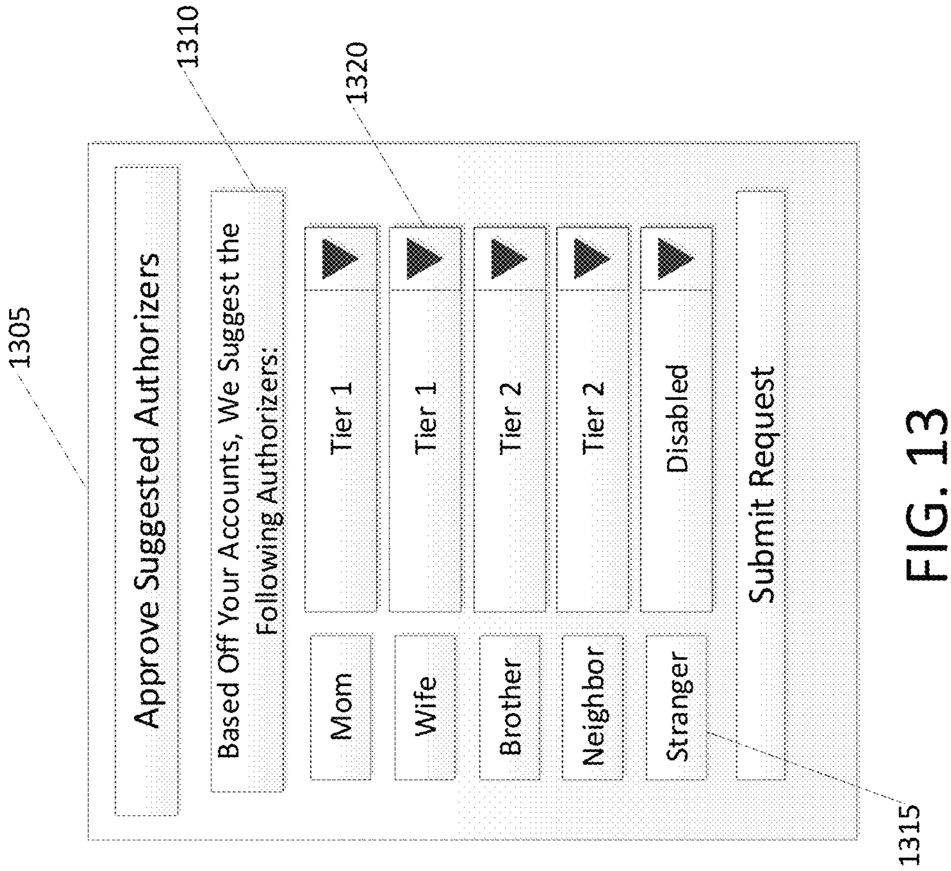
FIG. 13 depicts an illustrative example of a configuration screen that may be presented to a user for selecting among suggested authorizers.

FIG. 13 depicts an illustrative example of a configuration screen that may be presented to a user for selecting among suggested authorizers. Screen 1305 may present the user with a step to manage suggested authorizers. In some instances, the authorizers may be populated based on previous configuration, such as the configuration from FIG. 12. Screen 1305 may allow users to select authorizers to a tier globally, or screen 1305 may allow authorizers to be selected for a particular task or set of tasks. Information 1310 may give the user helpful information for selecting authorizers. Suggested authorizers 1315 may be presented to the user. The user may then be able to select or disable from among the suggested users using selection 1320. The selection 1320 may include the ability to place the suggested authorizers into particular tiers.

Figure 14:
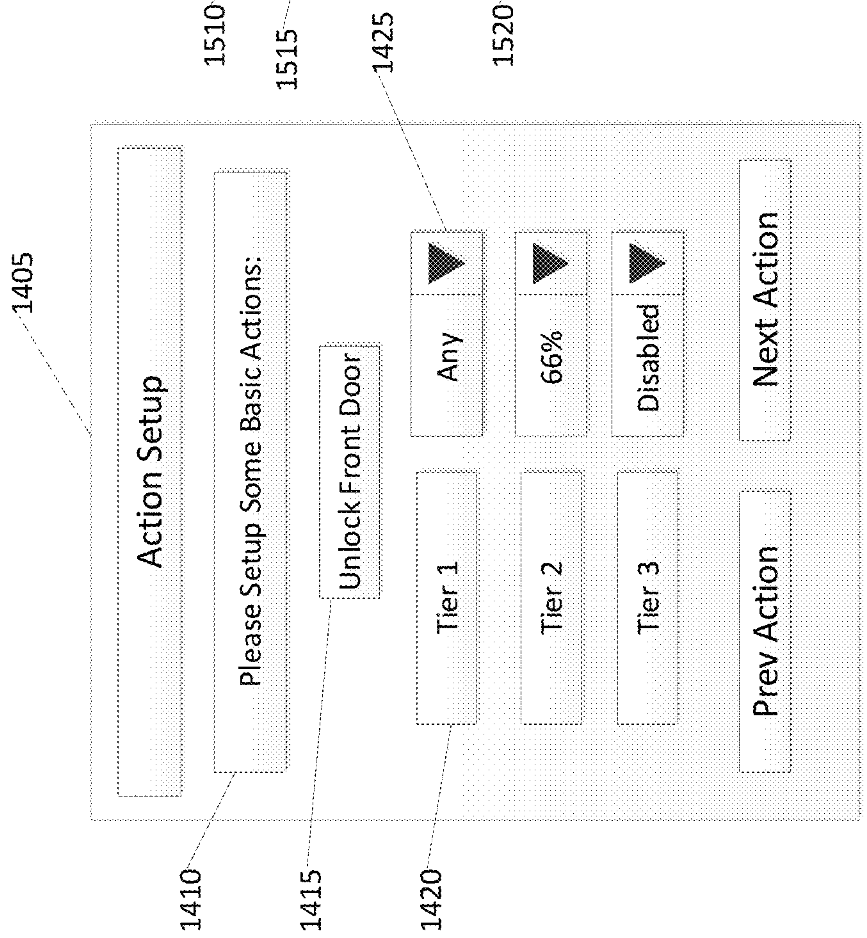
FIG. 14 depicts an illustrative example of a configuration screen that may be presented to a user for setting up actions.

FIG. 14 depicts an illustrative example of a configuration screen that may be presented to a user for setting up actions. Screen 1405 may present the user with a step to setup basic actions. In some instances, the user may want to change how different tiers interact with particular actions. Information 1410 may give the user helpful information for setting up actions. A description 1415 may describe the action to be configured. Tiers 1420 may be available for authorization for a particular task. In some instances, those tiers may have been configured as in FIG. 13. A selection 1425 may allow the user to configure the use of a tier for an action. For example, a user might configure unlocking a front door to be authorized by any member of tier 1 or a 66% consensus of tier 2, and have tier 3 disabled for that action.

Figure 15:
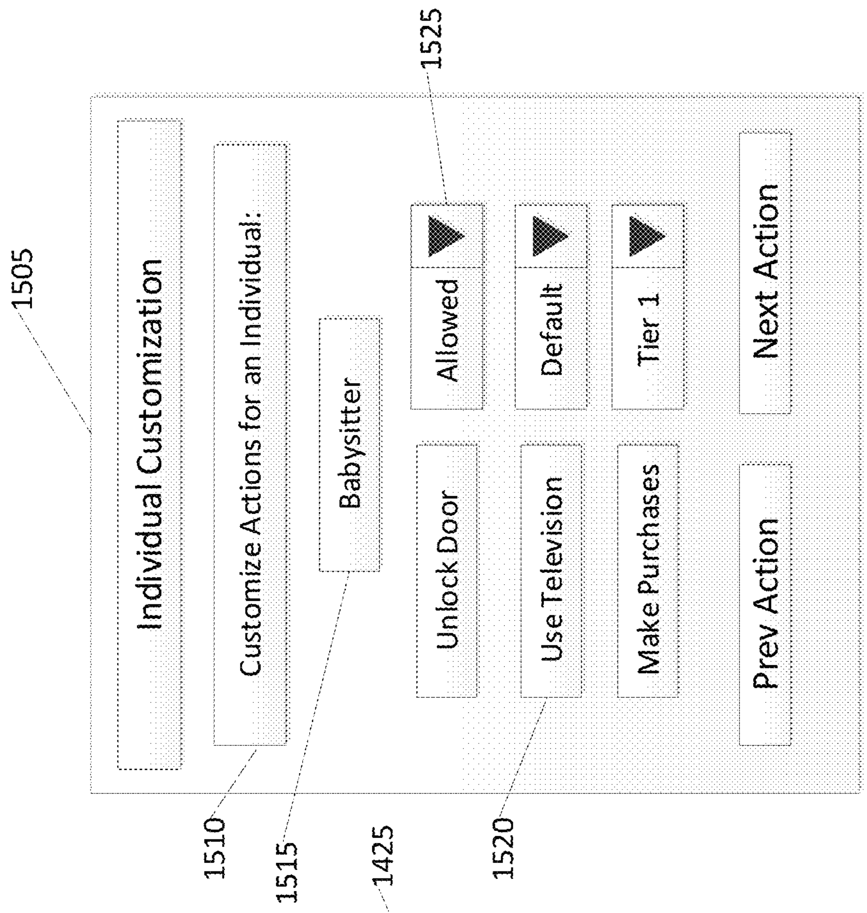
FIG. 15 depicts an illustrative example of a configuration screen that may be presented to a user for customizing authorizations for a particular requester.

FIG. 15 depicts an illustrative example of a configuration screen that may be presented to a user for customizing authorizations for a particular requester. Screen 1505 may present the user with a step to setup authorizations for a particular requester. In some instances, a requester may have greater or lesser standards of authorization for particular actions. For example, particular criteria for authorization may be applied towards a babysitter. Information 1510 may give the user helpful information for customizing authorizations pertaining to a requester 1515. Actions 1520 may present the user with different actions that can be configured. A selection 1525 may give the user different options for customizing authorization for particular actions for the requester. For example, the babysitter may be allowed to unlock the door without further authorization, follow default rules for using the television, and only be able to get permission for a purchase from a tier 1 authorizer.

Having discussed illustrative examples of device configuration in FIG. 12, FIG. 13, FIG. 14, and FIG. 15, discussion will now turn to an illustrative example of an authorization group database as in FIG. 16.

FIG. 16 depicts an illustrative example of an authorization group database. The database may be stored in a server at the home office 103, and/or in the computing device 200. Information pertaining to members of an authorization group may be stored in a database 1605. In some instances, the database may be a relational database. Each action 1610 may have its own entry, which may be related to other items in the database. For instance, a member 1615 may be assigned to an action 1610. In some instances, a member 1615 may be assigned to multiple actions. For example, John Q may be assigned as an authorizer for actions requesting unlocking a door or watching content on the television. The member may be assigned to a tier 1620 for that action. The tier may have an evaluation criterion 1625. For example, the first tier may be satisfied with any response, the second tier may need two thirds of the members to affirm the response, and the third tier may need all members to respond. The tier may have an associated wait time 1630. The wait time may specify how long a computing device should wait to hear back from members of a given tier for a given action before moving on to the next one. For example, a computing device may message tier 1 users and wait 5 minutes before messaging tier 2 users. If there is insufficient response, the computing device may then message tier 2 users and wait 10 minutes before messaging tier 3 users. The member may also have account information 1635. The account information may include contact information. For example, the account information 1635 may include an ID for an associated application, a phone number for SMS messaging, and a handle for social networking.

Figure 17:
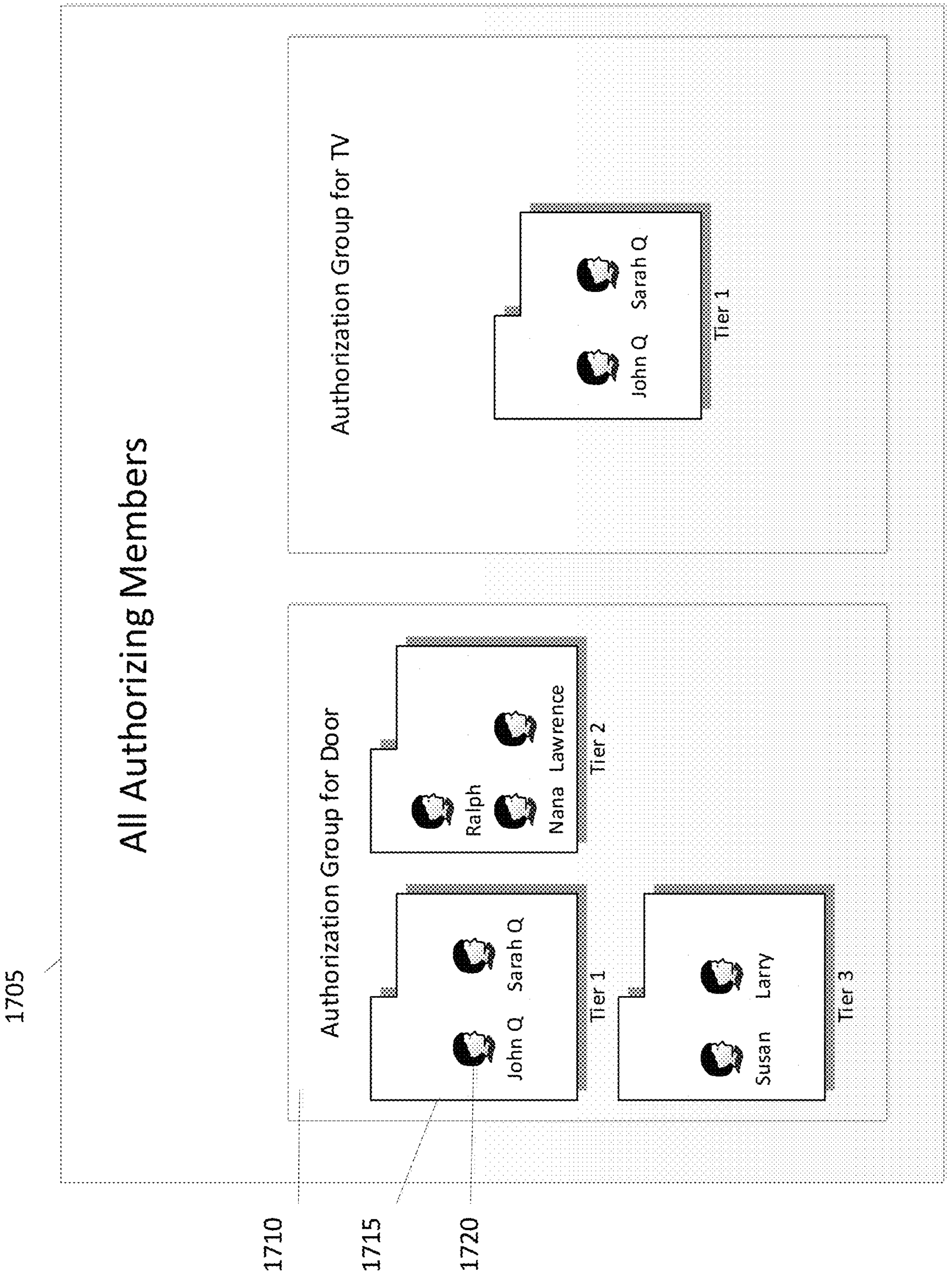
FIG. 17 depicts an illustrative example of an authorization group hierarchy.

Having discussed an illustrative example of an authorization group database in FIG. 16, discussion will now turn to an illustrative example of an authorization group hierarchy as in FIG. 17.

FIG. 17 depicts an illustrative example of an authorization group hierarchy. An authorization group database 1705 may hold all the authorizing members for an account. The authorizing members may be assigned to a particular authorization group for an activity 1710. Multiple authorization groups may exist. For example, there may be an authorization group for unlocking a door and an authorization group for watching content on the television. The authorization group may have one or more tiers 1715. Within each tier may be one or more authorizing members 1720. In some instances, authorizing members may be assigned to multiple authorization groups. For example, John Q may be assigned to the first tier of an authorization group for unlocking a door and a first tier for an authorization group for watching television.

Having discussed an illustrative example of an authorization group hierarchy in FIG. 17, discussion will now turn to an illustrative example of an authentication group database as in FIG. 18.

FIG. 18 depicts an illustrative example of an authentication group database. The database may be stored in a server at the home office 103, and/or in the computing device 200. Information pertaining to members of an authentication group may be stored in a database 1805. In some instances, the database may be a relational database. The authentication group database may contain multiple members 1807. Each member may have an assigned group 1810 for authentication. Further discussion of authentication groups may be found in FIG. 19. Authentication for the member may have an assigned criterion 1815. This may specify how many members must authenticate the individual. The tier may have an associated wait time 1820. The wait time may specify how long a computing device should wait for an authentication before giving up. The member may also have authentication information 1825. The authentication information may include identifying information such as a fingerprint, iris scan, voice sample, or photograph of the person which can be used to compare against fingerprint, voice, and/or photographs samples supplied by the requestor at the time of requesting an action (e.g., when an electrician is at the door).

Figure 19:
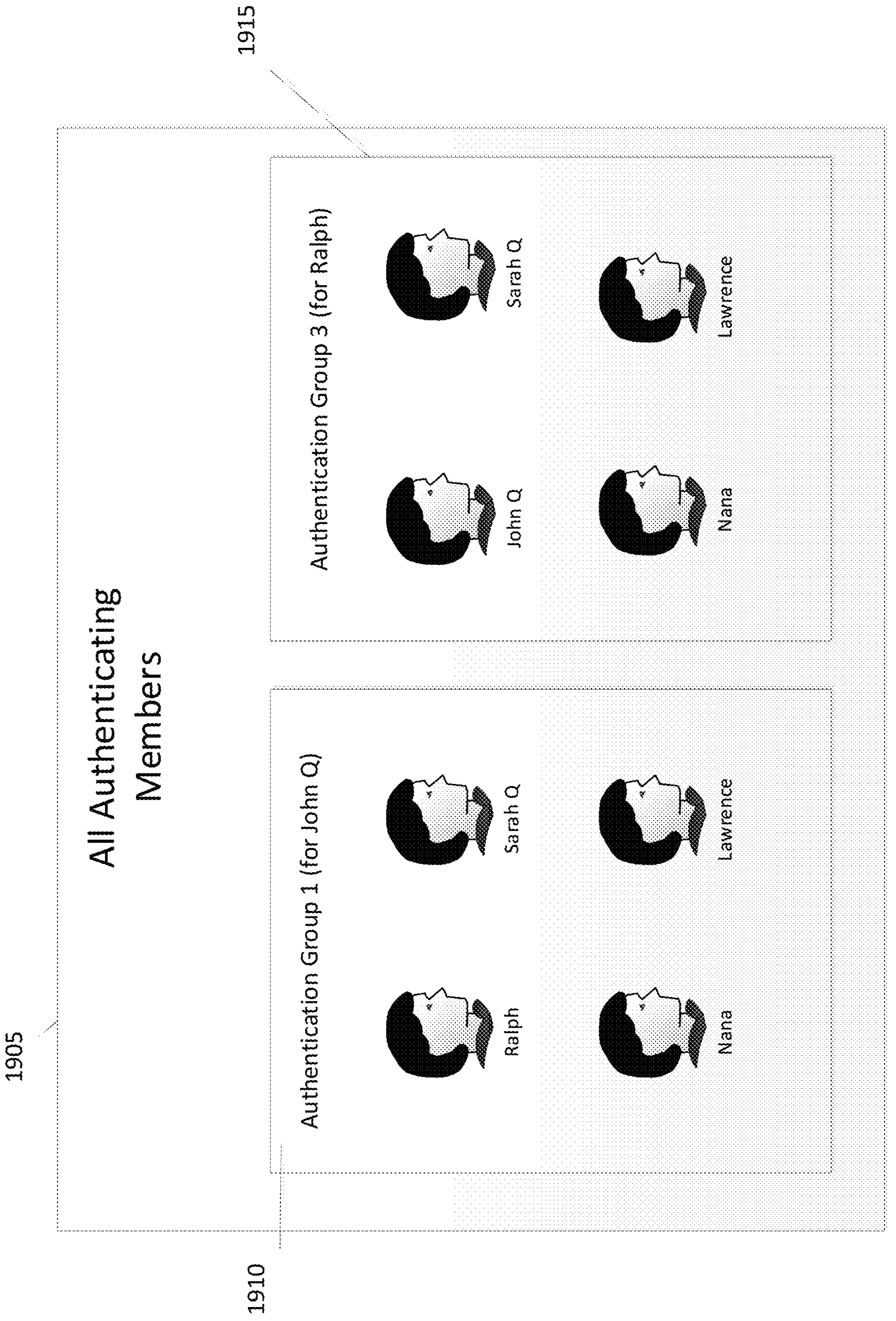
FIG. 19 depicts an illustrative example of an authentication group hierarchy.

Having discussed an illustrative example of an authentication group database in FIG. 18, discussion will now turn to an illustrative example of authentication groups as in FIG. 19.

FIG. 19 depicts an illustrative example of authentication groups. An authentication group database 1905 may hold all the authenticating members for an account. The authenticating members may be assigned to a particular authentication group for an individual as assigned in in group 1910. Multiple authentication groups may exist. For example, there may be an authentication group 1910 for one member and an authentication group 1915 for another member.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

The invention claimed is:

1. A method comprising:

receiving, by a computing device associated with a first user, a request for permission to perform an action for a requesting entity different from the first user;

sending, based on determining that the first user is unavailable, and to a plurality of devices associated with a plurality of second users who are associated with different weights for approving requests on behalf of the first user, messages based on the request;

receiving, by the computing device and from one or more devices, of the first plurality of devices, associated with a plurality of responding second users, response messages; and based on the response messages and response weights associated with the responding second users, causing performance of the action.

2. The method of claim 1, wherein the sent messages identify that the action comprises at least one of:

granting access to a premises;
unlocking a door;
granting access to media content;
changing a thermostat; or
conducting a financial transaction.

3. The method of claim 1, wherein each response weight indicates an association between the first user and a corresponding responding second user.

4. The method of claim 1, wherein the requesting entity comprises at least one of:

a third user;
a user device associated with the third user;
a set-top box;
a second computing device;
a thermostat;
a garage door opener; or
a security system.

5. The method of claim 1, wherein at least one response message comprises a denial of the request.

6. The method of claim 1, wherein the sent messages comprise information associated with a plurality of prior requests for performance of the action.

7. The method of claim 1, wherein the sent messages comprise comparison data based on a comparison of:

information associated with a plurality of prior requests for performance of the action; and information associated with the request for permission te perform the action received from the requesting entity, wherein the comparison data comprises at least one of request time data, request location data, and requestor identification data.

8. The method of claim 1, further comprising:

sending, to a plurality of third users that are authorized to authenticate an identity of the requesting entity, second messages associated with the request for permission to perform the action;

receiving, by the computing device, at least one response message from at least one of the plurality of third users; and prior to determining to approve the request for permission to perform the action, authenticating, based on the at least one response message from at least one of the plurality of third users, the identity of the requesting entity.

9. The method of claim 1, wherein the sent messages comprise status information of one or more additional computing devices associated with the request for permission to perform the action.

10. The method of claim 1, wherein the sent messages comprise one or more of:

information identifying the requesting entity,
information identifying one or more of the second users, or
information identifying a content item.

11. The method of claim 1, wherein the sent messages comprise status information of one or more of a security system, a computer network, a social media network, a digital video recorder, or a thermostat.

12. The method of claim 1, further comprising:

selecting the plurality of second users, for receipt of the messages associated with the request for permission to perform the action, based on an importance level of the request for permission to perform the action.

13. The method of claim 1, further comprising:

sending, to the requesting entity, a message indicating approval of the request for permission to perform the action.

14. The method of claim 1, wherein at least one response message comprises a passcode, the method further comprising:

comparing, by the computing device, the passcode to a stored passcode associated with the responding second user that caused sending the at least one response message, wherein determining to approve the request for permission to perform the action is based on a result of the comparing.

15. A method comprising:

receiving, by a computing device associated with a first user, a request for permission to perform an action for a requesting entity different from the first user;

sending, based on determining that the first user is unavailable, and to a plurality of devices associated with a plurality of second users who are associated with different weights for approving requests on behalf of the first user, messages based on the request;

receiving, by the computing device and from one or more devices, of the plurality of devices, associated with a plurality of responding second users, response messages; and based on the response messages and response weights associated with the responding second users, causing sending, to the requesting entity, a message indicating denial of the request.

16. The method of claim 15, wherein at least one response message comprises an approval of the request.

17. The method of claim 15, wherein each response weight indicates an association between the first user and a corresponding responding second user.

18. The method of claim 15, wherein the requesting entity comprises at least one of:

a third user;
a user device associated with the third user;
a set-top box;
a second computing device;
a thermostat;
a garage door opener; or
a security system.

19. The method of claim 15, further comprising:

after sending the message indicating denial of the request, receiving, from an additional responding second user, an additional response message approving the request for permission to perform the action; and based on receiving the additional response message approving the request for permission to perform the action and a first response weight associated with the additional responding second user, approving the request for permission to perform the action.

20. The method of claim 15, wherein the sending the messages based on the request comprises sending one or more of:

an image sample corresponding to the requesting entity, or an audio sample corresponding to the requesting entity.

21. A computing device associated with a first user, the computing device comprising:

one or more processors; and memory storing instructions that, when executed by the one or more processors, cause the computing device to:

receive a request for permission to perform an action for a requesting entity different from the first user;

send, based on determining that the first user is unavailable, and to a plurality of devices associated with a plurality of second users who are associated with different weights for approving requests on behalf of the first user, messages based on the request;

receive, from one or more devices, of the plurality of devices, associated with a plurality of responding second users, response messages; and based on the response messages and response weights associated with the responding second users, cause performance of the action.

22. The computing device of claim 21, wherein the sent messages identify that the action comprises at least one of:

granting access to a premises;

unlocking a door;

granting access to media content;

changing a thermostat; or conducting a financial transaction.

23. The computing device of claim 21, wherein each response weight indicates an association between the first user and a corresponding responding second user.

24. The computing device of claim 21, wherein at least one response message comprises a denial of the request.

25. The computing device of claim 21, wherein the sent messages comprise information associated with a plurality of prior requests for performance of the action.

26. A computing device associated with a first user, the computing device comprising:

one or more processors; and memory storing instructions that, when executed by the one or more processors, cause the computing device to:

receive a request for permission to perform an action for a requesting entity different from the first user;

send, based on determining that the first user is unavailable, and to a plurality of devices associated with a plurality of second users who are associated with different weights for approving requests on behalf of the first user, messages based on the request;

receive, from one or more devices, of the plurality of devices, associated with a plurality of responding second users, response messages; and based on the response messages and response weights associated with the responding second users, cause sending, to the requesting entity, a message indicating denial of the request.

27. The computing device of claim 26, wherein at least one response message comprises an approval of the request.

28. The computing device of claim 26, wherein each response weight indicates an association between the first user and a corresponding responding second user.

29. The computing device of claim 26, wherein the instructions, when executed, further cause the computing device to:

after sending the message indicating denial of the request, receive, from an additional responding second user, an additional response message approving the request for permission to perform the action; and based on receiving the additional response message approving the request for permission to perform the action and a first response weight associated with the additional responding second user, approve the request for permission to perform the action.

30. The computing device of claim 26, wherein the instructions, when executed by the one or more processors, cause the computing device to send the messages based on the request by causing the computing device to send one or more of:

an image sample corresponding to the requesting entity, or an audio sample corresponding to the requesting entity.

31. One or more non-transitory computer-readable media storing instructions that, when executed, cause:

receiving, by a computing device associated with a first user, a request for permission to perform an action for a requesting entity different from the first user;

sending, based on determining that the first user is unavailable, and to a plurality of devices associated with a plurality of second users who are associated with different weights for approving requests on behalf of the first user, messages based on the request;

receiving, by the computing device and from one or more devices, of the plurality of devices, associated with a plurality of responding second users, response messages; and based on the response messages and response weights associated with the responding second users, causing performance of the action.

32. The one or more non-transitory computer-readable media of claim 31, wherein the sent messages identify that the action comprises at least one of:

granting access to a premises;

unlocking a door;

granting access to media content;

changing a thermostat; or conducting a financial transaction.

33. The one or more non-transitory computer-readable media of claim 31, wherein each response weight indicates an association between the first user and a corresponding responding second user.

34. The one or more non-transitory computer-readable media of claim 31, wherein at least one response message comprises a denial of the request.

35. The one or more non-transitory computer-readable media of claim 31, wherein the sent messages comprise information associated with a plurality of prior requests for performance of the action.

36. One or more non-transitory computer-readable media storing instructions that, when executed, cause:

receiving, by a computing device associated with a first user, a request for permission to perform an action for a requesting entity different from the first user;

sending, based on determining that the first user is unavailable, and to a plurality of devices associated with a plurality of second users who are associated with different weights for approving requests on behalf of the first user, messages based on the request;

receiving, by the computing device and from one or more devices, of the plurality of devices, associated with a plurality of responding second users, response messages; and based on the response messages and response weights associated with the responding second users, causing sending, to the requesting entity, a message indicating denial of the request.

37. The one or more non-transitory computer-readable media of claim 36, wherein at least one response message comprises an approval of the request.

38. The one or more non-transitory computer-readable media of claim 36, wherein each response weight indicates an association between the first user and a corresponding responding second user.

39. The one or more non-transitory computer-readable media of claim 36, wherein the instructions, when executed, cause:

after sending the message indicating denial of the request, receiving, from an additional responding second user, an additional response message approving the request for permission to perform the action; and based on receiving the additional response message approving the request for permission to perform the action and a first response weight associated with the additional responding second user, approving the request for permission to perform the action.

40. The one or more non-transitory computer-readable media of claim 36, wherein the instructions, when executed, cause the sending the messages based on the request by causing sending one or more of:

an image sample corresponding to the requesting entity, or an audio sample corresponding to the requesting entity.

* * * * *